United States Patent [19]

Maki et al.

[11] Patent Number: 5,664,491

[45] Date of Patent: Sep. 9, 1997

[54] METHOD OF BALING AND COMPACTING MATERIAL HAVING A FORM MEMORY

[75] Inventors: Wayne Maki; Forrest Wildes, both of Baxley, Ga.; Fred Johnson, Ponte Vedra Beach, Fla.; Ken Roberts, Baxley, Ga.

[73] Assignee: Harris Waste Management, Inc., Atlanta, Ga.

[21] Appl. No.: 466,232

[22] Filed: Jun. 6, 1995

Related U.S. Application Data

[63] Continuation of Ser. No. 946,539, Sep. 16, 1992, abandoned.

[51] Int. Cl.$^6$ ........................................................ B30B 9/30
[52] U.S. Cl. ............................... 100/41; 100/90; 100/191
[58] Field of Search ............................. 100/35, 39, 41, 100/90, 97, 95, 179, 188 R, 191, 192

[56] References Cited

U.S. PATENT DOCUMENTS

| | | | |
|---|---|---|---|
| 2,332,170 | 10/1943 | Sapp | 100/192 |
| 2,595,503 | 5/1952 | Altgelt | 100/179 X |
| 2,833,633 | 5/1958 | Hecht | 100/191 X |
| 2,984,172 | 5/1961 | Roberts et al. | 100/90 |
| 3,438,319 | 4/1969 | Raab | 100/35 |
| 3,479,950 | 11/1969 | Freeman | 100/192 |
| 3,763,769 | 10/1973 | Bysouth et al. | 100/41 X |
| 3,785,280 | 1/1974 | LeJeune | 100/191 X |
| 3,991,670 | 11/1976 | Stromberg | 100/295 |
| 4,111,113 | 9/1978 | Lambert | 100/90 X |
| 4,203,600 | 5/1980 | Brown | 273/407 |
| 4,541,332 | 9/1985 | Horansky et al. | 100/35 X |
| 4,556,685 | 12/1985 | Sugio et al. | 524/141 |
| 4,661,290 | 4/1987 | Sauda et al. | 100/41 X |
| 4,884,682 | 12/1989 | Weder et al. | 206/83.5 |
| 4,961,375 | 10/1990 | Weder et al. | 100/45 |
| 5,111,741 | 5/1992 | Weder et al. | 100/45 |
| 5,317,965 | 6/1994 | Wildes et al. | 100/97 |
| 5,363,758 | 11/1994 | Wildes et al. | 100/97 |

FOREIGN PATENT DOCUMENTS

| | | | |
|---|---|---|---|
| 578986 | 10/1924 | France | 100/90 |
| 1092050 | 5/1984 | U.S.S.R. | 100/90 |
| 12429 | 5/1903 | United Kingdom | 100/179 |
| 1101061 | 1/1968 | United Kingdom | 100/191 |

*Primary Examiner*—Stephen F. Gerrity
*Attorney, Agent, or Firm*—Kirkpatrick & Lockhart

[57] ABSTRACT

Polystyrene baler for extreme compaction of expanded polystyrene or other similar materials where a ram forcibly acts to compress the expanded polystyrene material into a narrowing chamber where the narrowing chamber walls further act to compress the expanded polystyrene material to allow for air or gases trapped in the polystyrene material to escape so that a densely packed polystyrene bale is formed. A continuous bale is formed which can be broken or cut into desired lengths or weights. Vertically aligned walls of the bale chamber can be hydraulically actuated to accommodate the degree of compaction desired.

5 Claims, 31 Drawing Sheets

| ITEM | QTY | DESCRIPTION | ITEM | QTY | DESCRIPTION |
|---|---|---|---|---|---|
| 1 | 1 | SUCTION STRAINER | 13 | | |
| 2 | 1 | MTR/PUMP COUPLING | 76 | 1 | MAIN CYLINDER |
| 54 | 1 | MOTOR | 15 | 1 | MOD. PRESS. RED. VALVE |
| 4 | 1 | PUMP | 16 | 1 | |
| 5 | 1 | UNLOADING VALVE | 17 | 1 | |
| 6 | 1 | UNLOADING CK VALVE | 18 | 1 | |
| 7 | 1 | RELIEF VALVE | 19 | 2 | TENSION CYLINDER |
| 8 | 1 | 3/4" CK VALVE | 20 | 1 | FILTER |
| 9 | 2 | PRESSURE GAUGE | 21 | 1 | SIGHT GAUGE |
| 10 | 1 | PRESSURE SWITCH | 22 | 1 | FILTERED BREATHER |
| 11 | 1 | OØ6 SUBPLATE | 23 | 1 | HYDRAULIC TANK |
| 12 | 1 | MAIN DIR. VALVE | | | |

HYDRAULIC TANK
55"X42"X10.5" 105 TO 175
US GALLONS

METHOD OF BALING AND COMPACTING MATERIAL HAVING A FORM MEMORY

CROSS REFERENCES TO CO-PENDING APPLICATIONS

This is a continuation of Ser. No. 07/946,539 filed on Sep. 16, 1992, now abandoned.

BACKGROUND OF THE INVENTION

1. Field of the Invention

The present invention is for a baler, and more particularly, pertains to a baler for expanded polystyrene, also known as foam polystyrene or foam. The continuous compacted expanded polystyrene of the baler can be cut into a length which is manageable in terms of weight, such as that proscribed by OSHA, and can be cut into predetermined lengths by an ordinary person.

2. Description of the Prior Art

Prior Art balers have not been practical for baling expanded polystyrene because the ram did not have sufficient penetration into the baling or compression chamber, and therefore, could not compress the material sufficiently into a mass. Therefore, high-volume and low-mass materials generally have been very difficult to bale because of the lack of suitable ram penetrating forces in the baling chamber. Bales of high volume-low mass material made with prior art balers were unstable and tended to come apart even with any handling.

Expanded polystyrene is a material of particular concern to environmentalists, as the material is of high volume and low mass, and is taking up considerable space in landfills. Polystyrene is used to package a wide assortment of products, such as washers, dryers, refrigerators, other household appliances, TVs, audiovisual equipment, model trains, and just about any other type of product which is shipped in a box. The expanded polystyrene packaging can range from peanuts, spaghetti, small blocks measured in inches, to large shapes measured in feet. Expanded polystyrene also comes in what is referred to as peanuts, spaghetti or denoted with other cute names, and is used as packing material to protect goods in packages or boxes against damage in transit.

The wide diversity of sizes and shapes of polystyrene complicates the baling problem. Of course, it would be possible to sort polystyrene waste according to size and density, but this adds expense and complicates the recycling process.

The subsequent disposal of polystyrene is of very serious concern to the environmentalists, who in the past have had no real recourse but to see this type of packing material buried in landfills, wasting landfill space, which is now considered a precious, non-renewable natural resource.

One particular concern of baling polystyrene was to achieve a bale weight of high density for transportation and recycling. The higher density bales formed by the present invention have a 12"×12" profile and can be appropriately cut to keep the bale weight within a 40 pound maximum as required by OSHA, or to a desired length for palleting.

Expanded polystyrene, in the past, was not able to be recycled. It is only recently that it has been possible to recycle polystyrene. Now there has been a need created to effectively bale expanded polystyrene on a cost-efficient basis so that the economies were appropriate for handling of baled polystyrene, especially by truck. Achieving the appropriate bale density for cost-efficient handling and transportation is not only important, but is being demanded by the recycling industry, as well as the transportation industry for cost efficient transportation.

The present invention overcomes the disadvantages of the prior art by providing a high density baling system for expanded polystyrene packing material, where the bales of the polystyrene are formed into convenient size which can be recycled which saves, protects and preserves the environment, and especially for transportation to a recycler.

SUMMARY OF THE INVENTION

The general purpose of the present invention is a polystyrene baler for baling expanded polystyrene material, and having a ram in cooperation with ever narrowing walls in the degasification and densification chamber to provide for continuous baling of the material.

According to one embodiment of the present invention, there is provided a baler with a conveyor for elevating materials to a hopper. The conveyor conveys material from a ground position up to a point at an opening in the top of the baler above a charging box. The conveyor has a chopper at the lower end, closest to the floor and away from the baler, to chop pieces of expanded polystyrene into smaller pieces suitable for baling. The baler includes a ram having sufficient penetrating forces with a ram face pressure to fully compress material against a chamber or a chamber with ever narrowing chamber allowing for escape of gases.

One significant aspect and feature of the present invention is a baler having a chamber which can reduce in cross section size along its length to provide for continuous degasification and densification in baling of a material. The baler bales material for subsequent recycling in an ecological manner while conserving energies and resources.

Another significant aspect and feature of the present invention is a baler which can simultaneously compresses along its length and across its cross section to obtain a more densely packed continuous bale which can be separated or later cut into predetermined sizes.

Still another significant aspect and feature of the present invention is a baler which produces a continuous cross section in a continuous length bale, by way of example and for purposes of illustration only and not to be construed as limiting of the present invention, can be broken or cut to an appropriate length or weight as desired or predetermined. The cross section can range from 8" to 16", and in one example is 14" high by 13–12" wide.

An additional significant aspect and feature of the present invention includes a baler for baling of expanded polystyrene packing material, which may vary from packing peanuts to large physical pieces which are used to pack appliances, such as washers, dryers, or refrigerators.

Still an additional significant aspect and feature of the present invention is a baler which chops large-sized material of loose density, such as high-volume and low-density polystyrene into smaller pieces. The polystyrene chopper includes powerful rotary fingers or teeth which chops and sizes incoming expanded polystyrene material to enhance baling efficiency and provides a dimension of the expanded polystyrene material. The chopper can be positioned wherever desired, such as above an air system or adjacent a conveyor such as a lower portion of a conveyor.

Other significant aspects and features of the present invention is a baler for polystyrene or other low-density, high-volume materials which obtains a preferred bale weight or dimension for various types of materials. Other types of material could include copper wire, aluminum scraps or shavings. The baler includes the ability to bale expanded polystyrene and obtain one preferred OSHA manageable bale weight in the range of 40 pounds. The chopper includes the ability to chop polystyrene or low-density materials to be baled at a convenient location prior to feeding these materials into the baler. By way of example and for purposes of illustration only and not to be construed as limiting of the present invention, in one environment, a chopper mechanism is provided at a lower end of the conveyor prior to conveying the chopped materials, such as the polystyrene materials, upwardly into an upper open area of the baler.

Having thus described the embodiments of the present invention, it is a principal object hereof to provide a baler for baling expanded polystyrene or other materials to degas and densify a bale square, log or cube.

One object of the present invention is to provide a baler with a chopper to chop the expanded polystyrene or other loose-density material prior to baling.

Another object of the present invention is a baler specially designed to uniformly degas and densify, and bale expanded polystyrene materials in a high production environment. The high pressure hydraulic system delivers powerful compaction force, enough to compress and breakdown the expanded polystyrene foam material past the material's form memory. The ram travels to deliver material compaction forcing material towards and into the compression chamber to be ever further compacted into a continuous stream of material in the degassing and densification chamber, which can be either constant in cross section, or preferably, narrowing in cross section to further enhance degasification and densification of the baled material.

An additional object of the present invention is a polystyrene densifier baler to bale polystyrene material for easy handling subsequent to recycling.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

Figure 18:
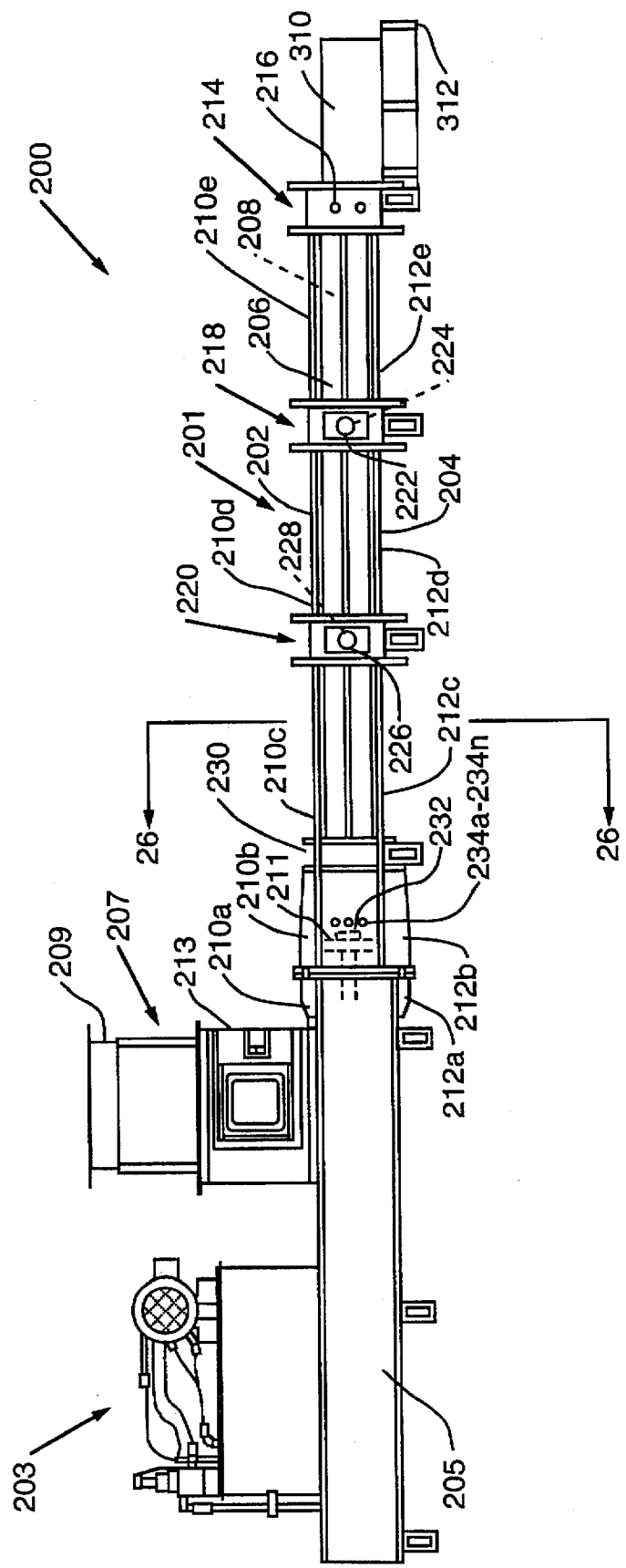
Figure 24:
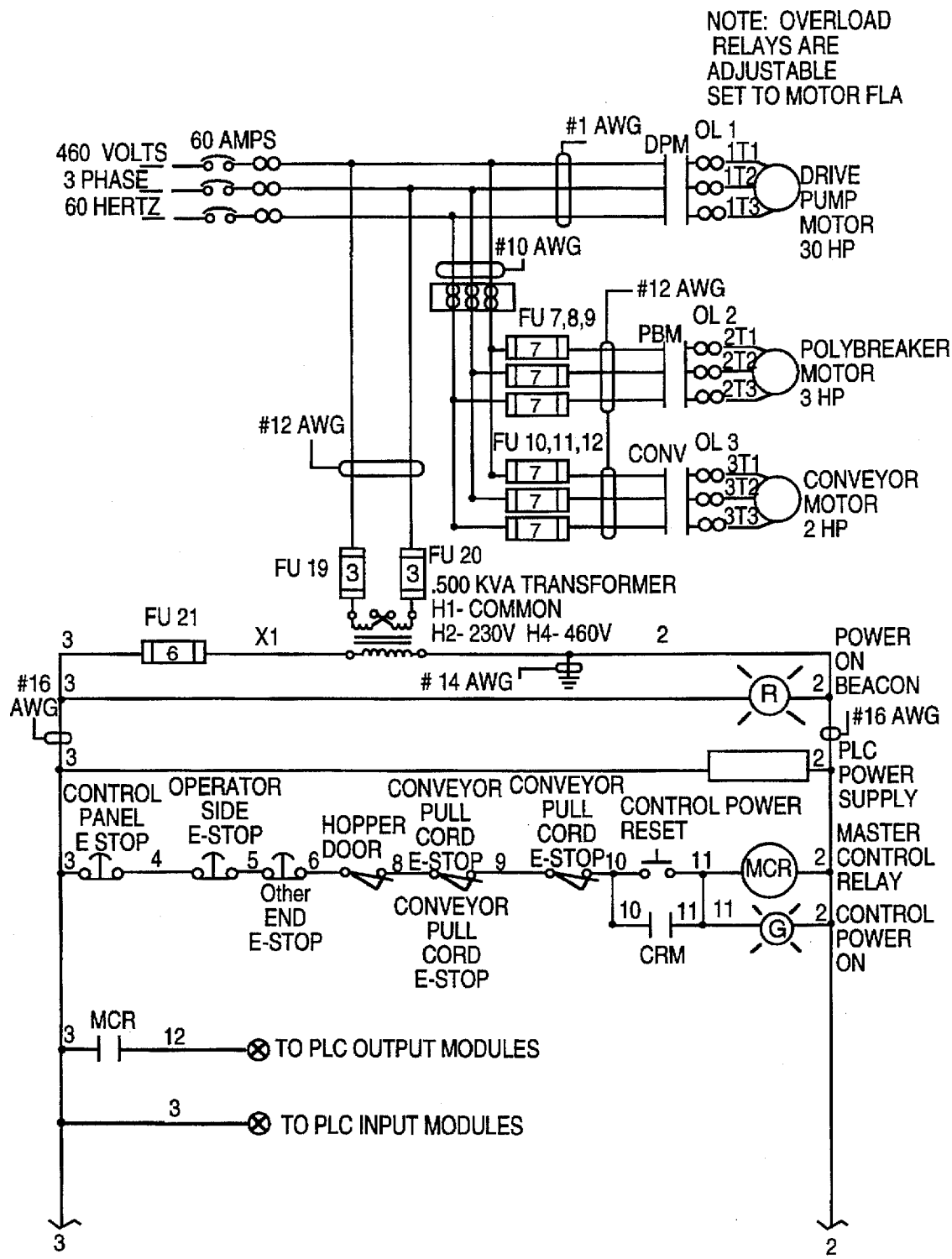
Figure 25A:
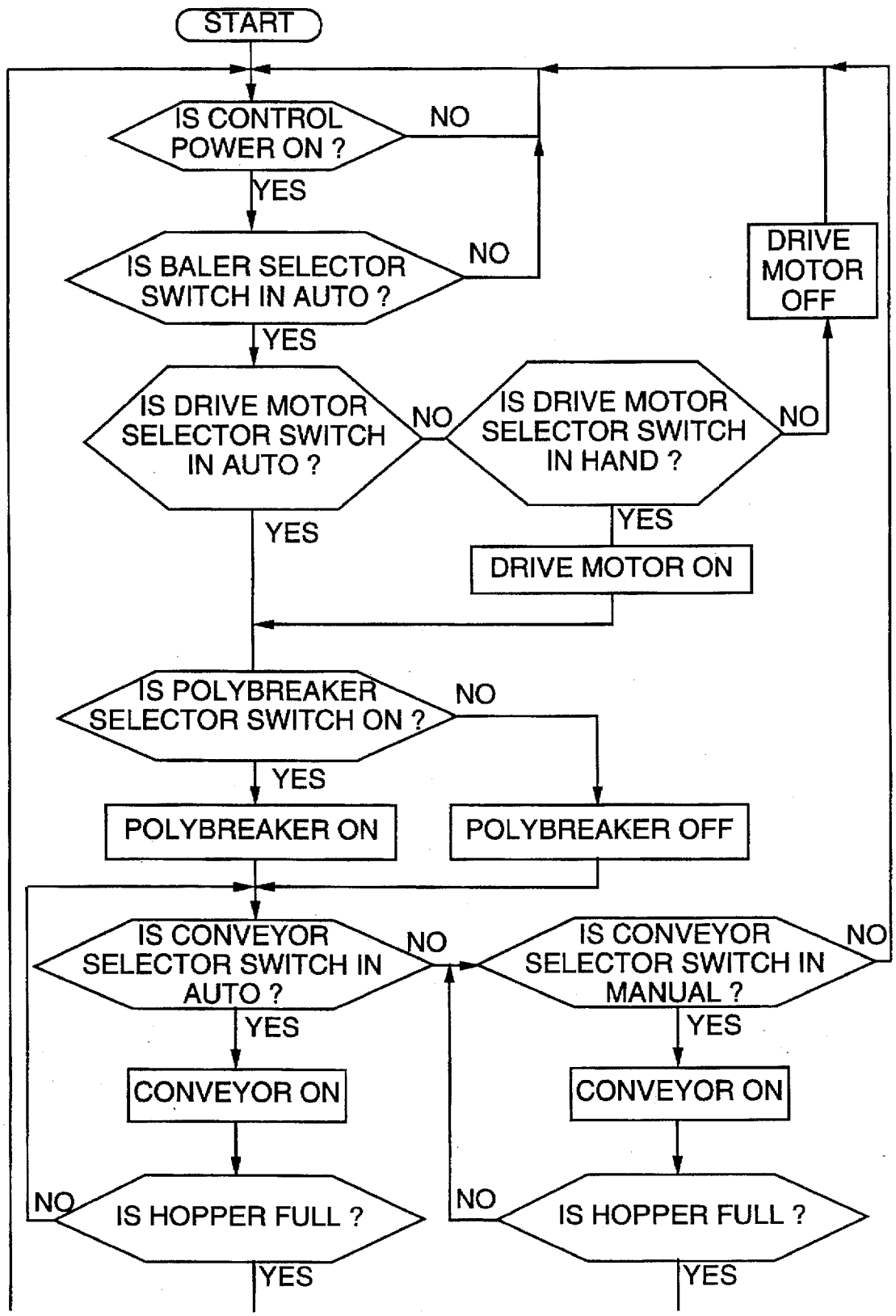
Figure 25B:
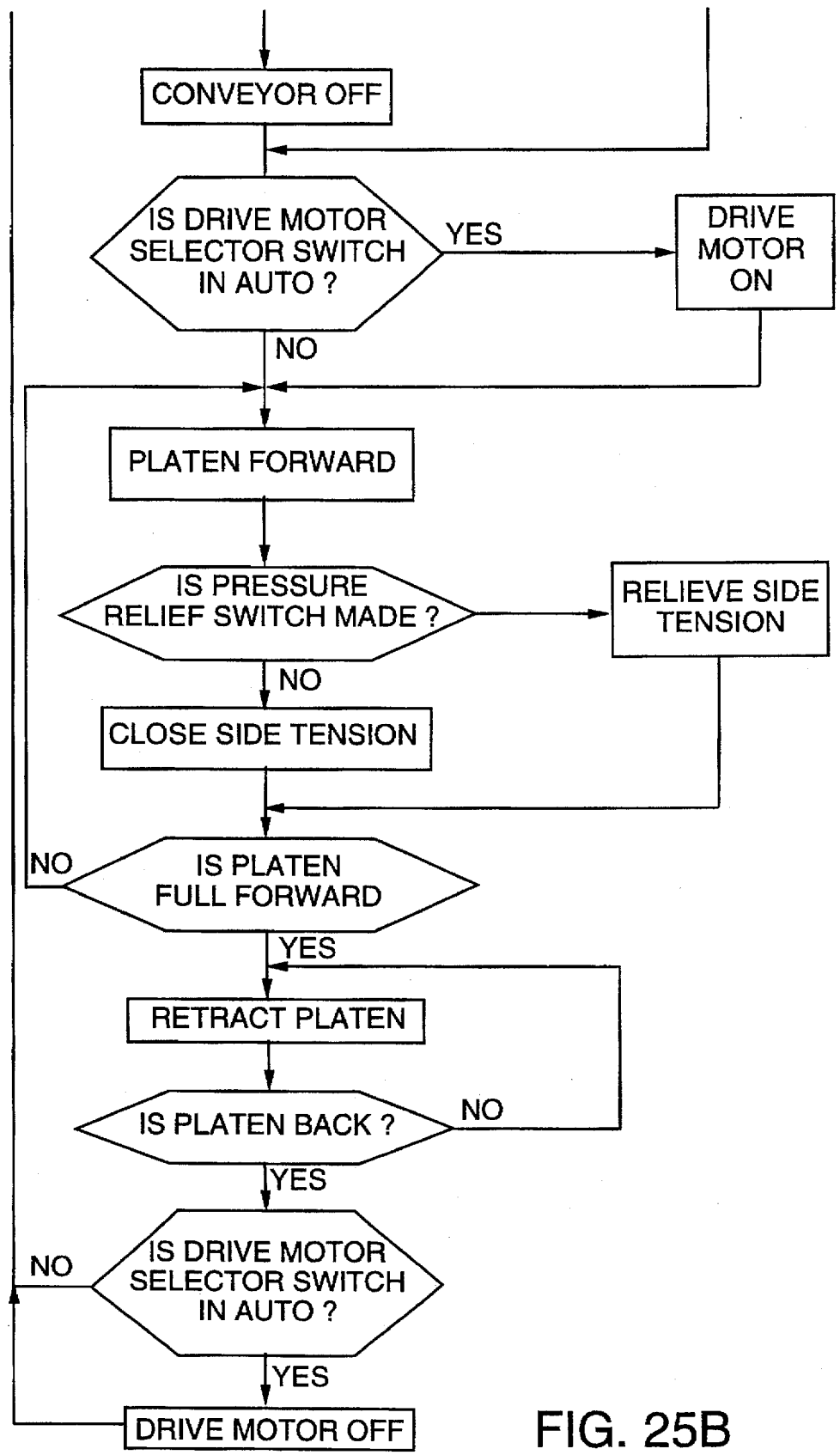
Figure 26:
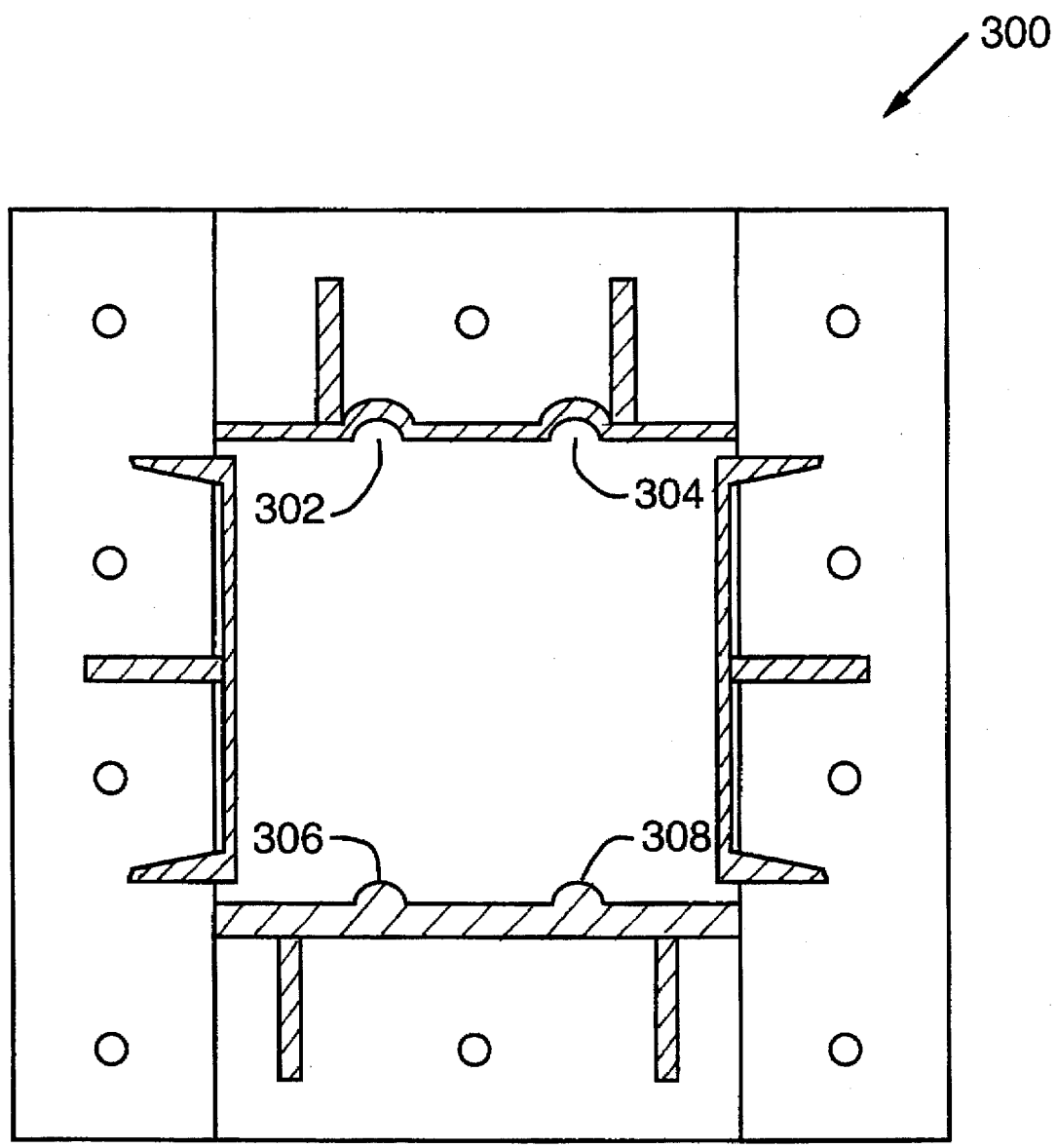

PIG. 23A–23B illustrate an electrical schematic diagram for FIG. 18;

FIG. 24 illustrates an electrical schematic diagram for the polystyrene baler;

FIG. 25A and 25B illustrate a flow chart for the operation of the polystyrene baler; and, FIG. 26 illustrates a cross-sectional view of the degasification and densification chamber with grooves and ridges for stacking of baled material.

DETAILED DESCRIPTION OF THE PREFERRED EMBODIMENTS

Figure 1:
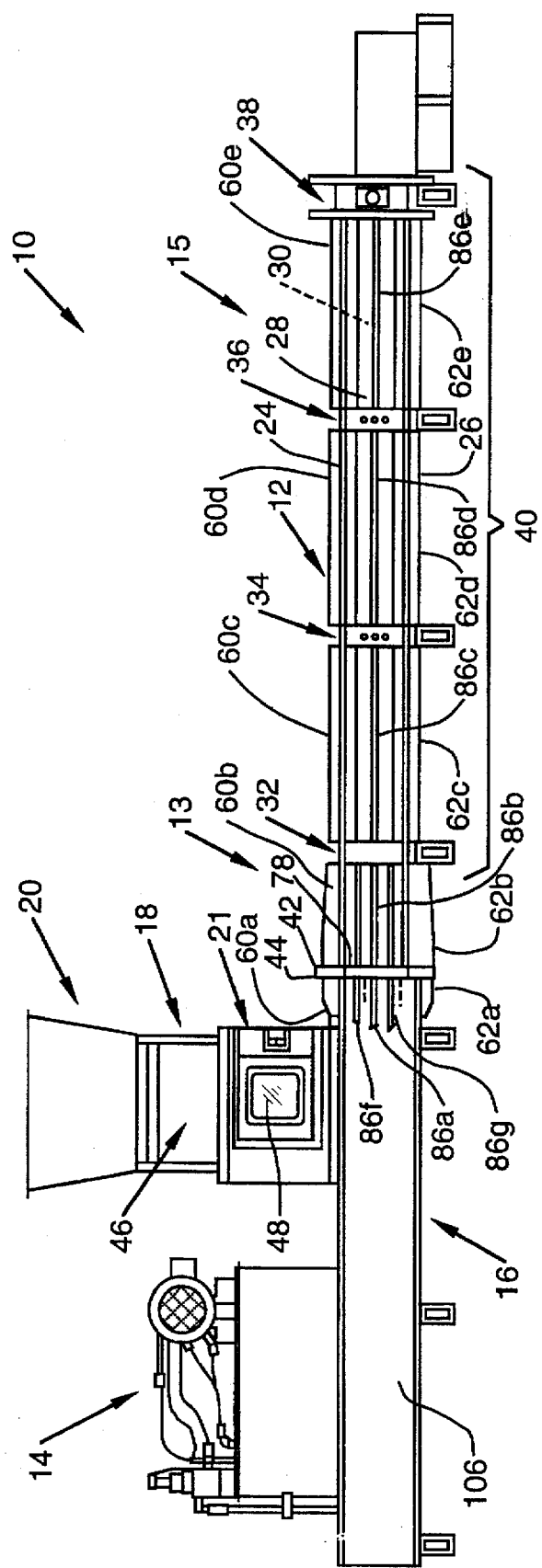
FIG. 1 illustrates a side view of a polystyrene densifier baler, the present invention.
Figure 2:
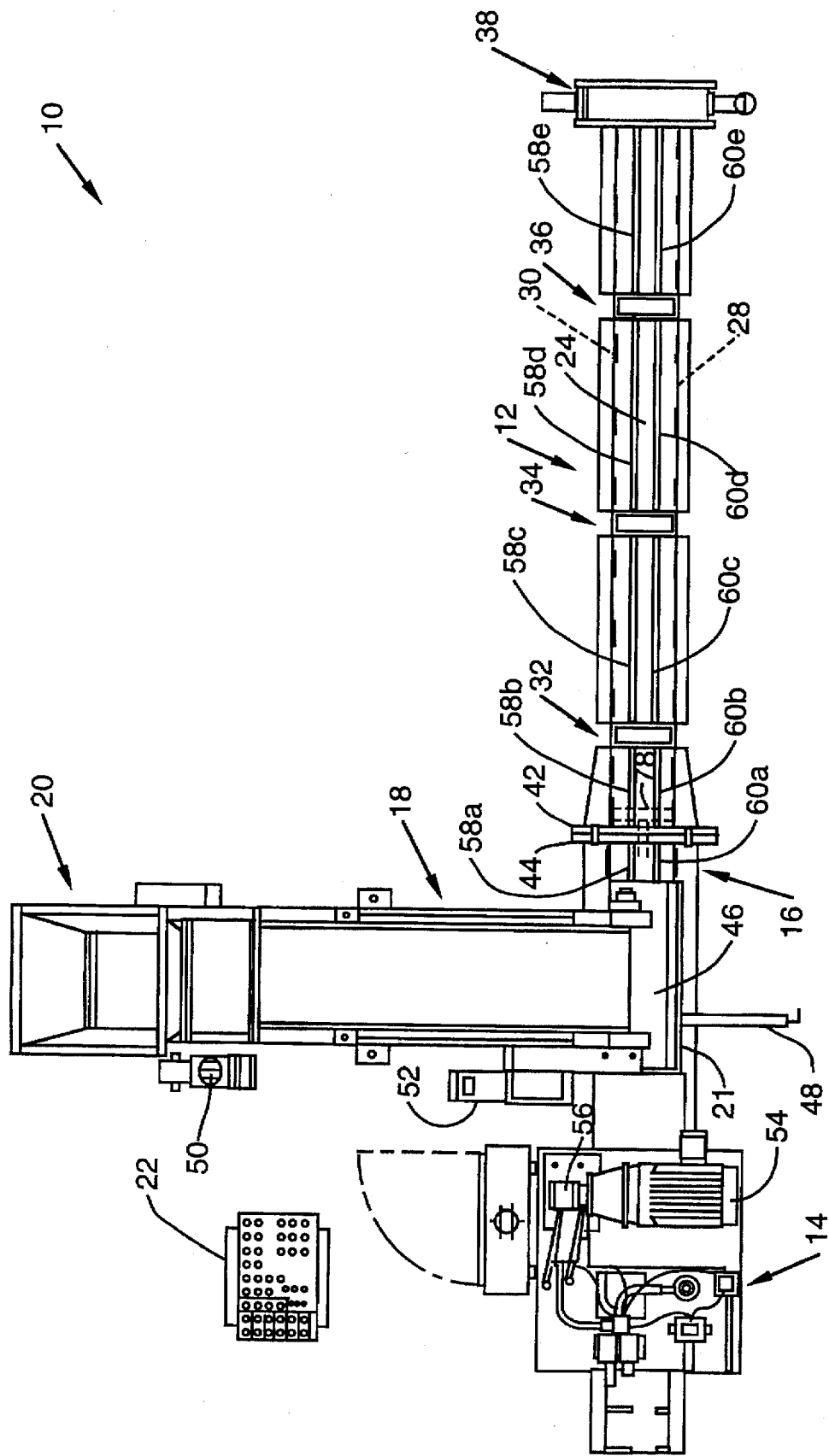
FIG. 2 illustrates a top view of the polystyrene densifier baler.

FIG. 1 illustrates a side view of an expanded polystyrene degasification and densification baler 10, the present invention, including a charge chamber 12, a hydraulic power unit 14, a ram enclosure 16, a conveyor 18, a tapered hopper 20, having internal chopper teeth fingers, a hopper 21, and a control stand 22 illustrated in FIG. 2. The baler 10 includes a top 24, a bottom 26 and sides 28 and 30, which adjust inwardly between yoke assemblies 32, 34, 36 and 38 to form a tapered compression area 40 extending between yoke assemblies 38 and to the left of flanges 42 and 44, which connect the bale chamber 12 to the ram enclosure 16. A ram enclosed in the ram enclosure 16 forces polystyrene material loaded from the tapered hopper 20 and conveyor 18, and through a loading opening 46 at the upper region of the hopper 21 into a compression chamber 13 and then towards a degasification and densification chamber 15. Force is applied to compress the polystyrene by two methods. First, force is applied longitudinally by the force of the ram, and secondly, then laterally across the material by the tapered sides 28 and 30 of the bale chamber 12 as the material is forced along the length of the degasification and densification chamber 15, as illustrated by way of example and for purposes of illustration only and not to be construed as limiting of the present invention. An access door 48 is also provided for the hopper 21. A plurality of support struts or strengtheners align about the baler top 24, sides 28 and 30 and bottom 26 as later illustrated in more detail.

Figure 5:
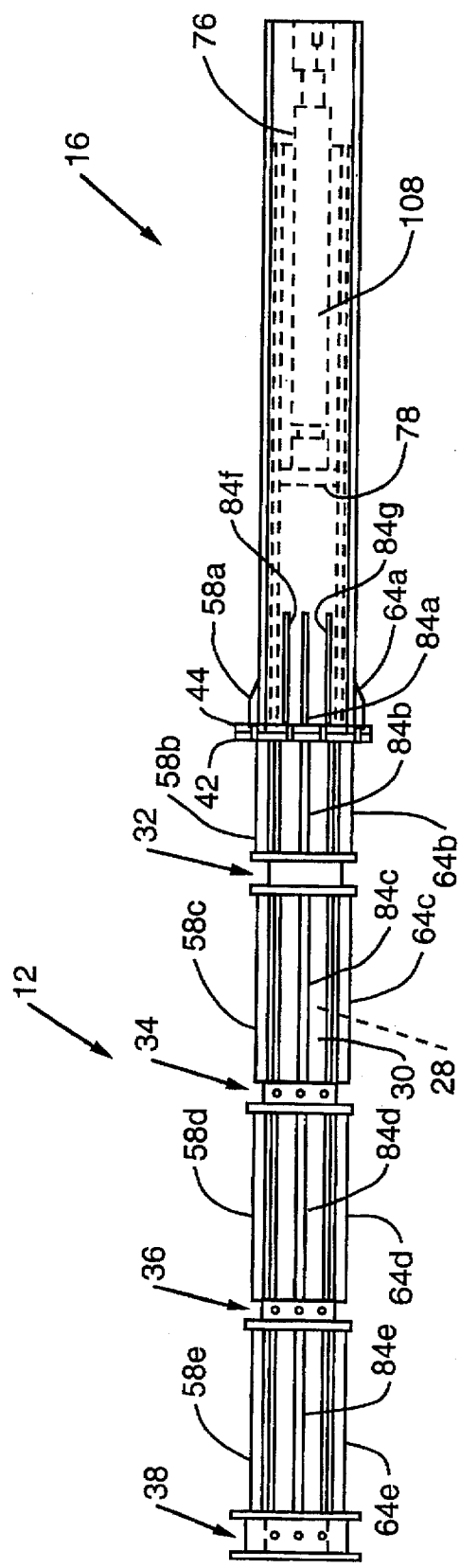
FIG. 5 illustrates a side view of the bale chamber.
Figure 6:
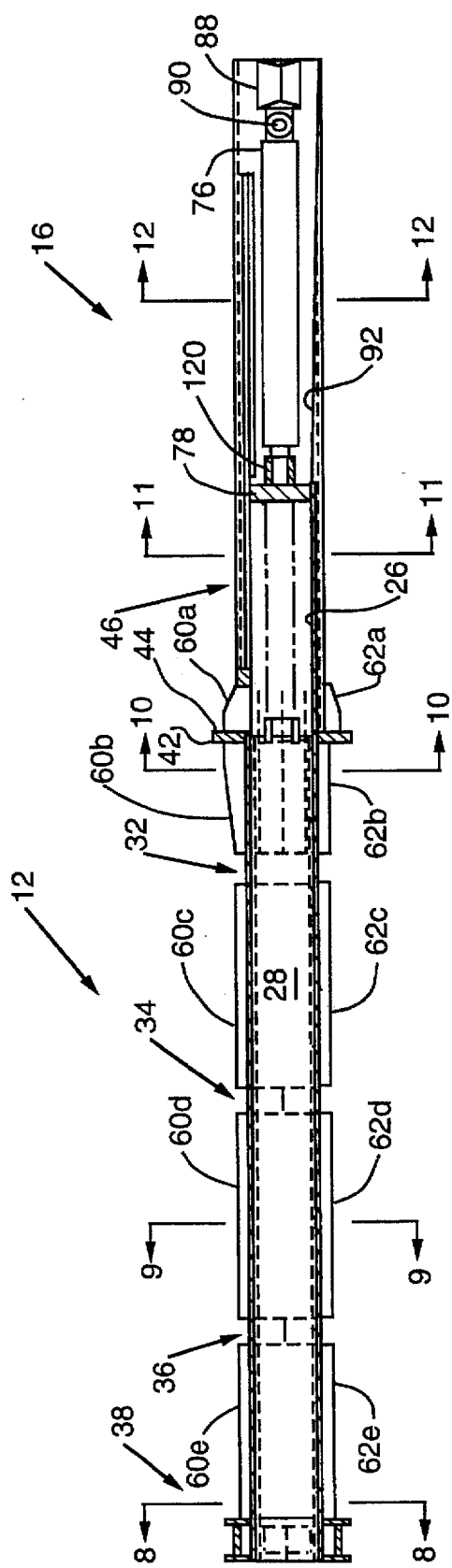
FIG. 6 illustrates a cross-sectional side view of the bale chamber.

FIG. 2 illustrates a top view of the polystyrene densifier baler 10 where all numerals correspond to those elements previously described. Illustrated in particular is the alignment of the conveyor 18 with the load area 46 of the charge chamber 12. Motor 50 powers the tapered hopper 20, which includes a polystyrene chopper (not illustrated) for breaking the polystyrene pieces into smaller more manageable sized pieces. A motor 52 powers the conveyor 18. A hydraulic motor 54 and a pump 56 on the hydraulic power unit 14 provides for hydraulic pressure for operation of the ram as illustrated in FIG. 6. A series of upper support struts or strengtheners 58a–58e and 60a–60e align along the top 24 and along, between and adjacent to the yoke assemblies 32–38 and flanges 42 and 44. In the same manner, an opposing set of lower support struts or strengtheners 62a–62e and 64a–64e align along the bottom 26 and are illustrated in FIGS. 1 and 5.

Figure 3:
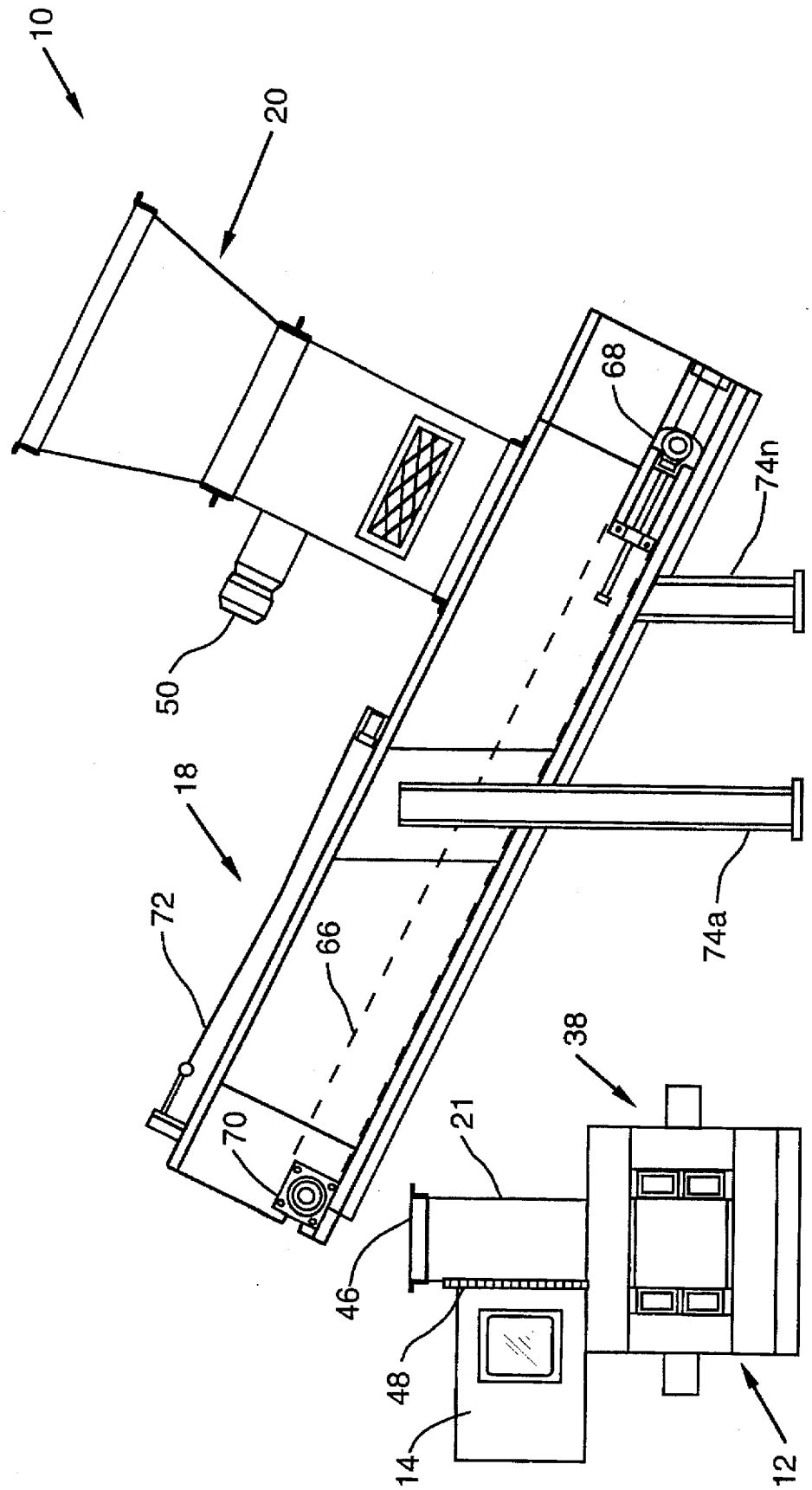
FIG. 3 illustrates an end view of the polystyrene densifier baler.

FIG. 3 illustrates an end view of the polystyrene densifier baler 10 where all numerals correspond to those elements previously described. The conveyor 18 includes a conveyor belt 66 aligned between a powered adjustable drive roller assembly 68 and a tail roller assembly 70. One or more optional safety stop lines 72 align along the upper region of the conveyor 18. A plurality of legs 74a–74n provide support for the conveyor 18.

FIGS. 4–7 illustrate views of the baler 10 and ram enclosure 16 from the rearward side of the polystyrene densifier baler 10.

Figure 4:
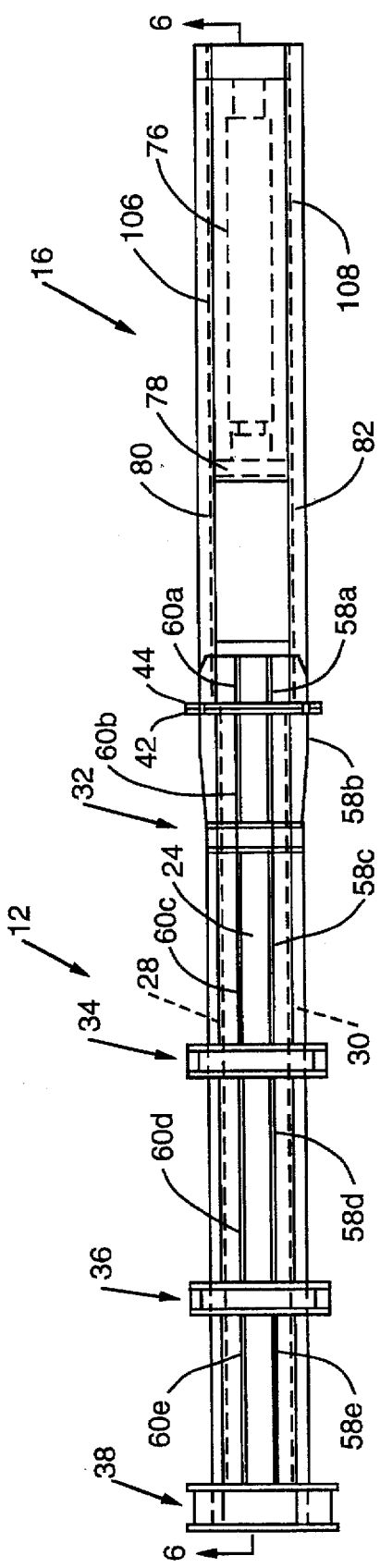
FIG. 4 illustrates a top view of the bale chamber.

FIG. 4 illustrates a top view of the baler 10 and ram enclosure 16 where all numerals correspond to those elements previously described. The ram cylinder 76 and ram head 78 are shown in dashed lines between side walls 80 and 82 of the ram enclosure 16. The side walls 80 and 82 are constructed of vertically aligned steel channel material, one end of which is secured such as by welding to the flange 44. The sides 28 and 30 are also constructed of vertically aligned steel channel material, one end of which is secured such as by welding to the flange 42 extending along the length of the bale chamber 12 to the end yoke assembly 38. As previously described, the side walls 28 and 30 can adjust inwardly to decrease the bale chamber 12 size along the length of the bale chamber 12 as later described in detail.

FIG. 5 illustrates a side view of the baler 10 and the ram enclosure 16. Sides 30 and 28 are constructed of steel channel material and include support struts 84a–84e secured between, along and adjacent to the yoke assemblies 32–38 and flanges 42 and 44 on the side 30. Support struts 86a–86e align in a similar fashion to the opposing side 28 as illustrated in FIG. 1. Struts 84f and 84g align parallel to struts 84a and struts 86f and 86g and align parallel to strut 86a.

FIG. 6 illustrates a cross-sectional side view of the baler 10 and ram enclosure 16 along line 6—6 of FIG. 4. The ram cylinder 76 secures to one end of the ram enclosure 16 by a bracket 88 and pin 90. A ramped member 92 secures to one end of the bale chamber 12 and on the other end secures to the bottom 26 of the ram enclosure 16. The bottom 26 extends below the load area 46 and along the length of the bale chamber 12.

Figure 7:
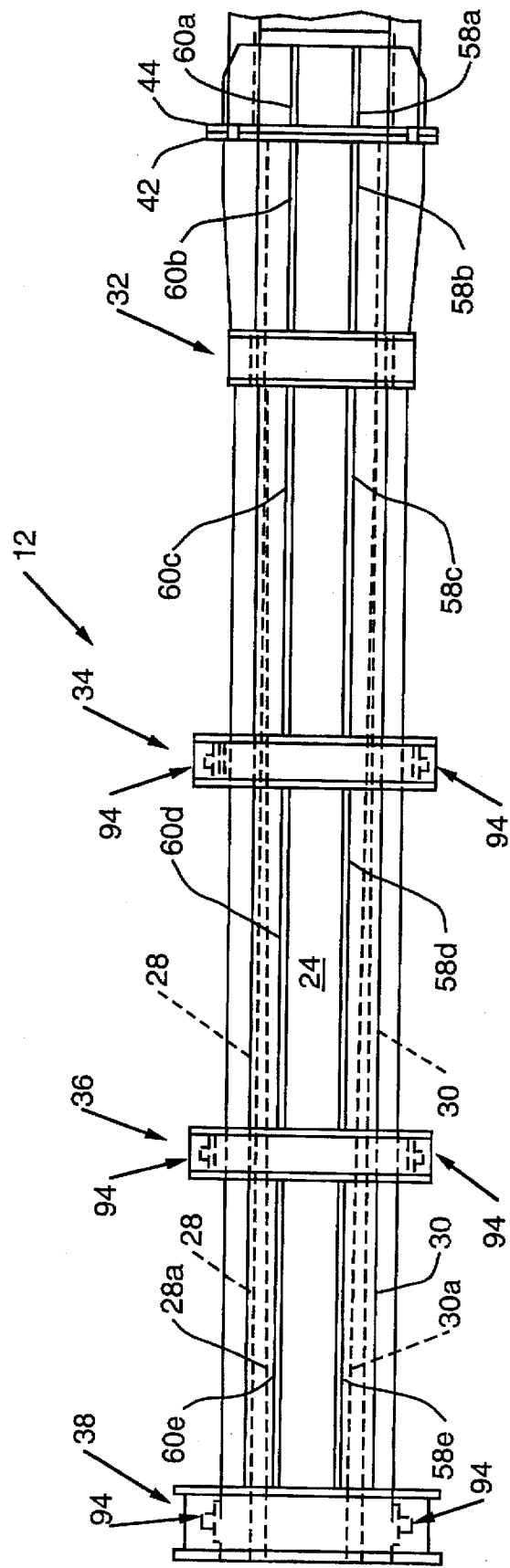
FIG. 7 illustrates a top view of the bale chamber.

FIG. 7, a top view of the bale chamber 12, illustrates the moveable sides 28 and 30 forming an ever narrowing bale chamber 12 i.e., a cross sectional area of the chamber 12 decreases along its length, where all numerals correspond to those elements previously described. Opposing side adjuster assemblies 94, such as those illustrated in FIG. 8, adjust the sides 28 and 30 inwardly and laterally across the bale chamber 12 to a position illustrated by dashed lines 28a and 30a. Yoke assemblies 34, 36 and 38 each include opposing adjuster assemblies 94.

Figure 8:
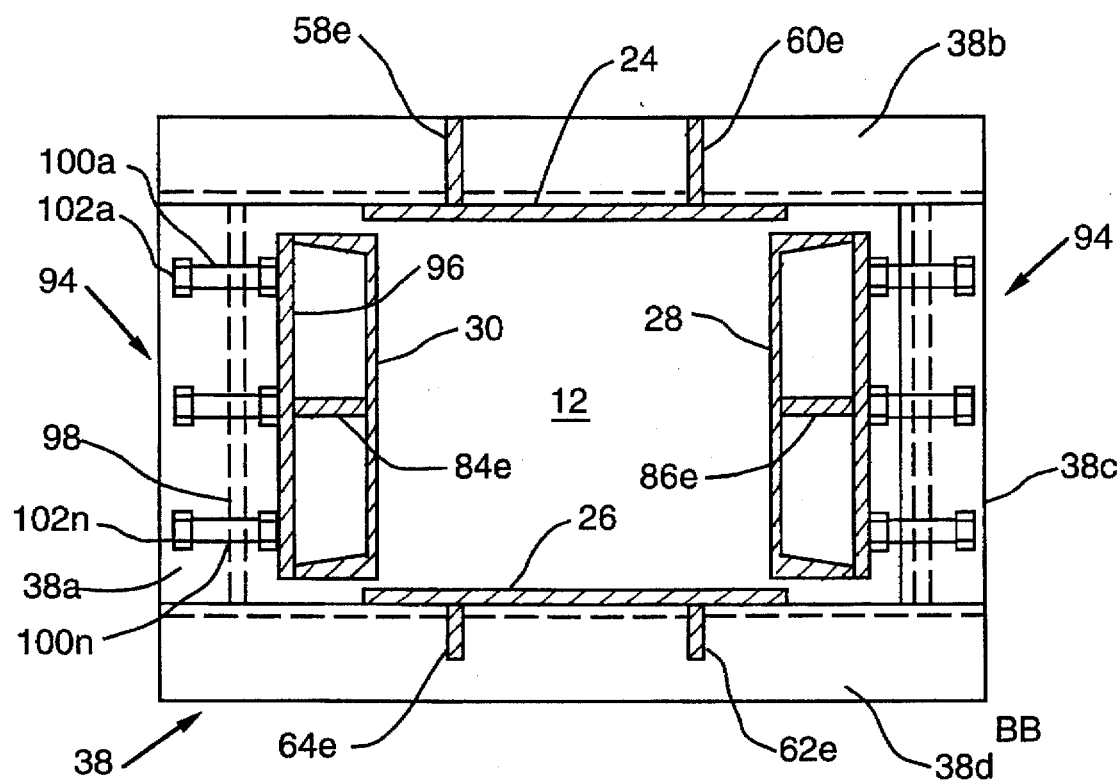
FIG. 8 illustrates a cross-sectional view along line 8—8 of FIG. 6.

FIG. 8 illustrates a cross-sectional view along line 8—8 of FIG. 6 illustrating side adjuster assemblies 94 and the yoke assembly 38 where all numerals correspond to those elements previously described. Yoke assembly 38 includes horizontal channel members 38b and 38d and vertical channel members 38a and 38c aligned between the horizontal channel members 38b and 38d as illustrated. Other yoke members are constructed in a similar fashion. One side adjuster assembly 94, similar to others distributed along and about other yoke assemblies, is now described in relationship to the vertical side member 28. A plate 96 secures, such as by welding, across the channel member comprising the side 28 and the support strut 84e. Another plate 98 secures on the channel member 38a of the yoke assembly 38 and has a plurality of threaded holes 100a–100n which accommodate bolts 102a–102n. Bolts 102a–102n have nuts 104a–104n fixedly secured at their ends to act as bearing surfaces against the plate 96 secured vertically across the channel member comprising the side 28 and the support strut 84e.

Figure 9:
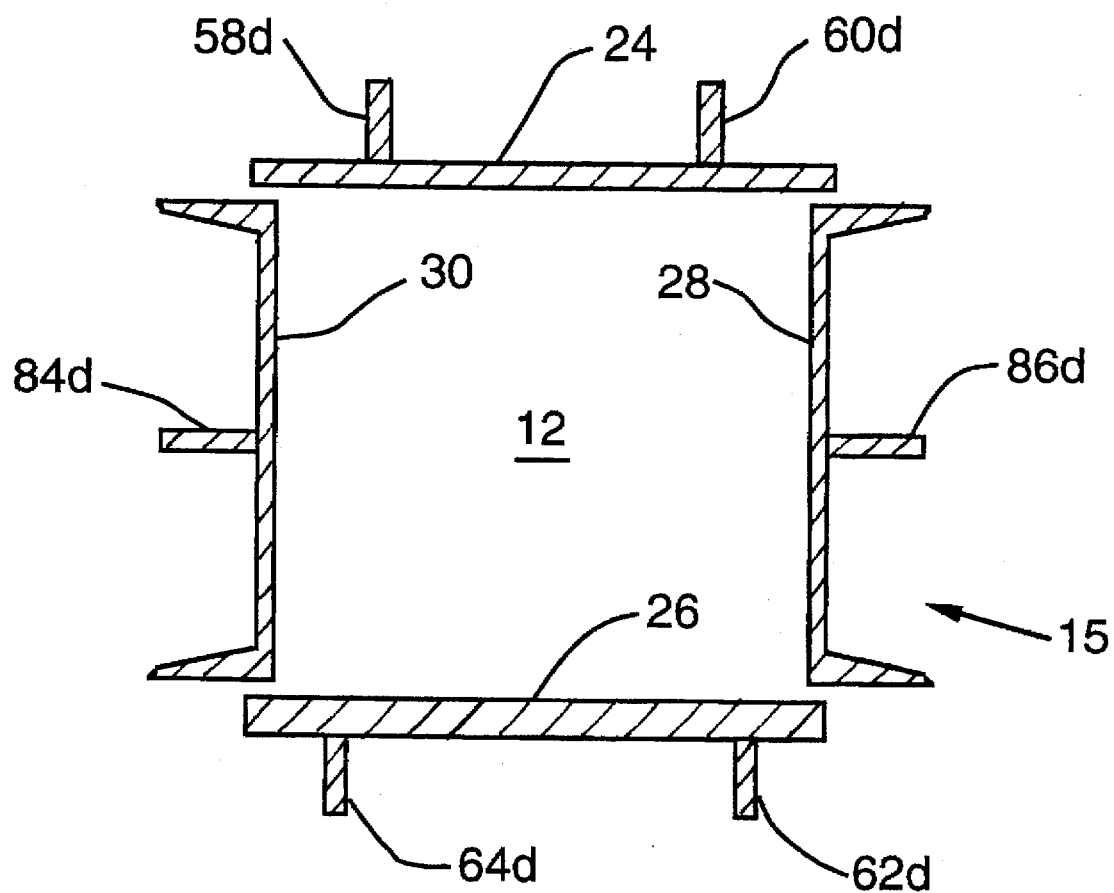
FIG. 9 illustrates a cross-sectional view along line 9—9 of FIG. 6.

FIG. 9 illustrates a cross-sectional view along line 9—9 of FIG. 6 showing the relationship of the adjustable sides 28 and 30 to the top and bottom members 24 and 26. It is noted that the top and bottom members 24 and 26 remain stationary, and the sides 28 and 30 are adjusted inwardly as described in FIG. 8. As polystyrene is forced down the chamber 15, gases and air from the compressed materials are allowed to escape between the open corners of the chamber 15, which are fit with an air gap for the purpose of letting the gases escape. The longer the length of travel in this chamber, there is more opportunity to degas and densify the resulting log of compressed material which exits at the end of chamber 15. These fit corners are formed by the intersections of the sides 28 and 30 with the top and bottom members 24 and 26.

Figure 10:
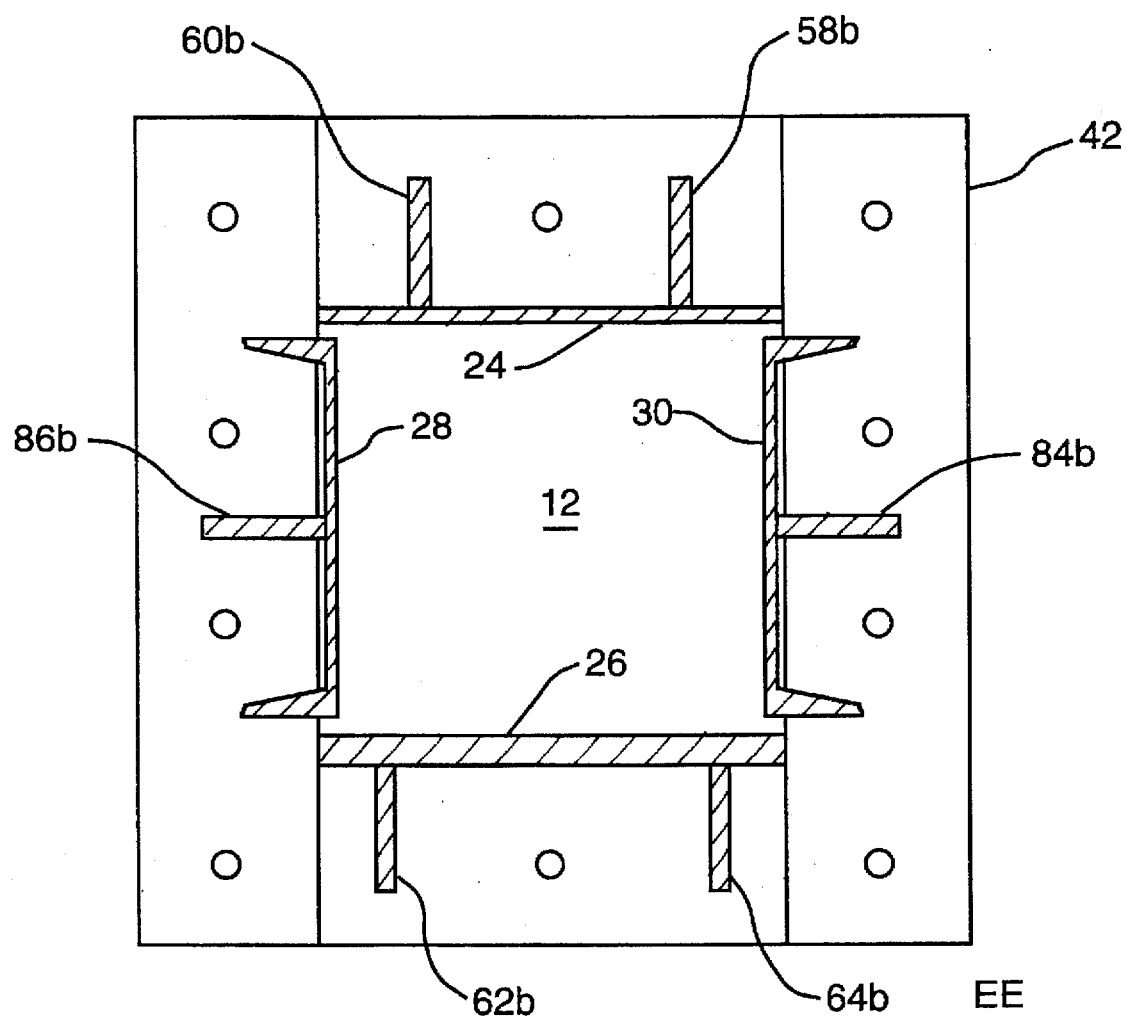
FIG. 10 illustrates a cross-sectional view along line 10—10 of FIG. 6.

FIG. 10 illustrates a cross-sectional view along line 10—10 of FIG. 6 where all numerals correspond to those elements previously described. The flange 42 is a common anchor and support point for the top 24, bottom 26 and the opposing sides 28 and 30.

Figure 11:
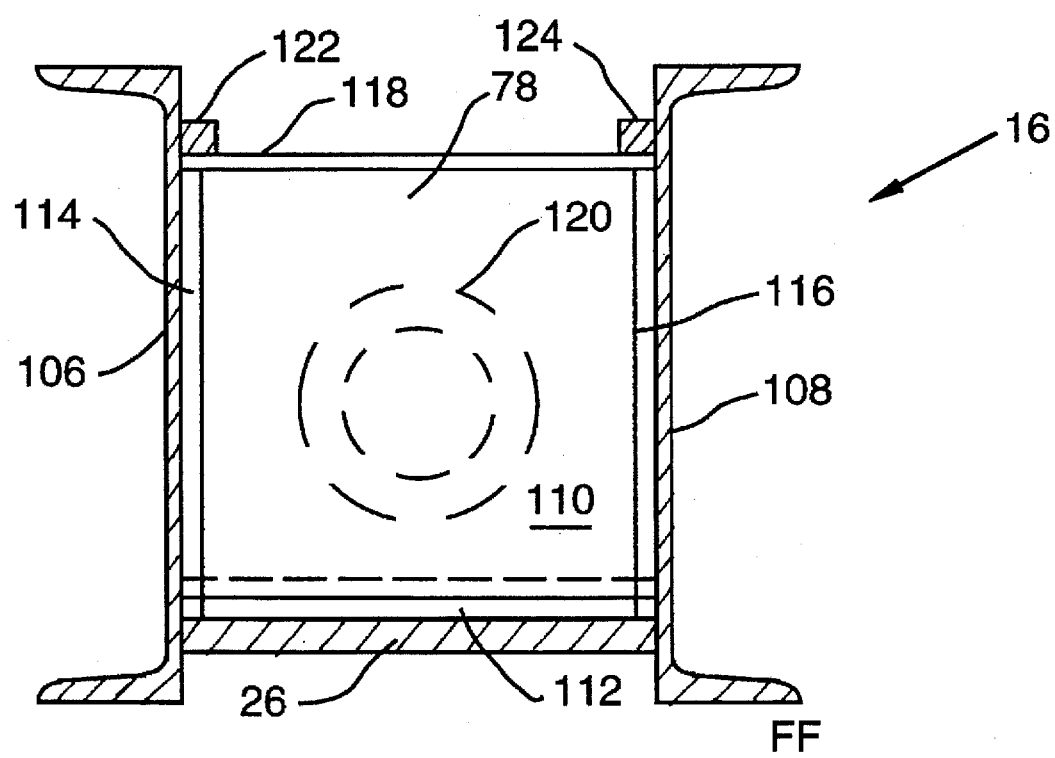
FIG. 11 illustrates a cross-sectional view along line 11—11 of FIG. 6.

FIG. 11 illustrates a cross-sectional view along line 11—11 of FIG. 6 where all numerals correspond to those elements previously described. Illustrated in particular is the ram face plate 78 aligned between the side walls 106 and 108 of the ram enclosure 16. The ram face plate 78 includes a front 110, a bottom side plate 112, side plates 114 and 116, a planar top member 118 and a connecting flange 120. Guide bars 122 and 124 align at the upper and inner surfaces of the side walls 106 and 108, respectively, to guide the top member 118 of the ram head 78.

Figure 12:
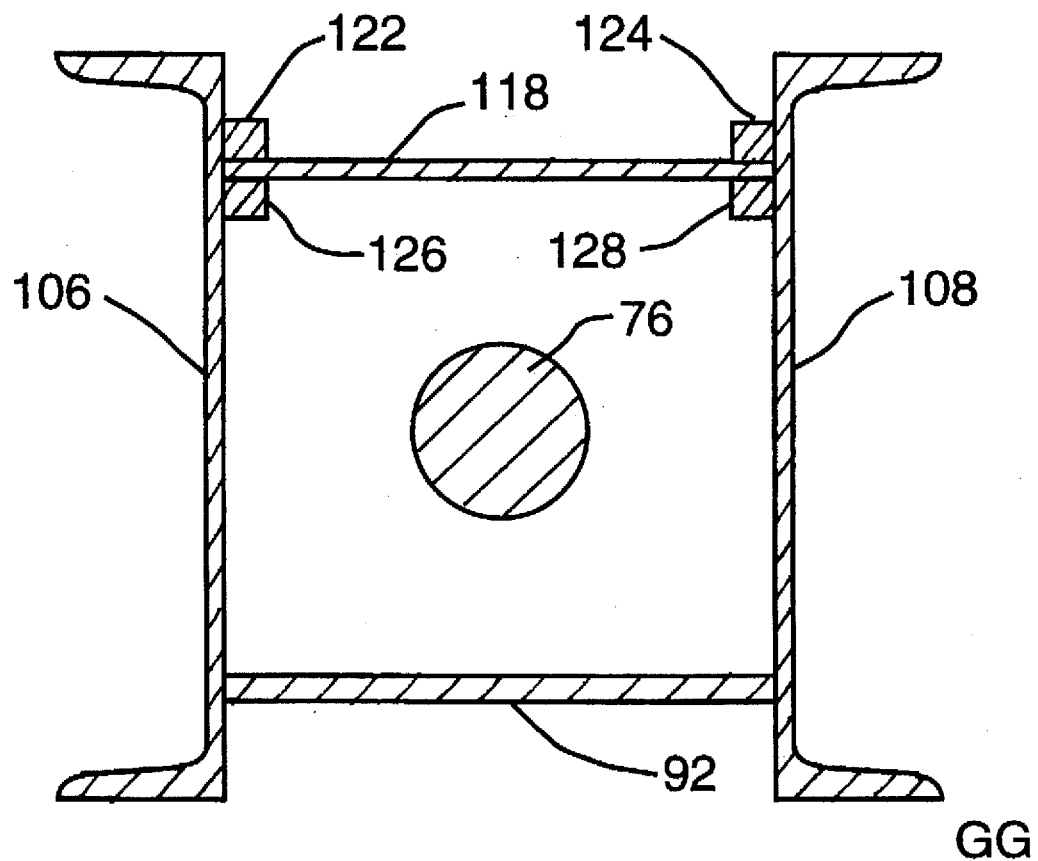
FIG. 12 illustrates a cross-sectional view along line 12—12 of FIG. 6.

FIG. 12 illustrates a cross-sectional view along line 12—12 of FIG. 6 where all numerals correspond to those elements previously described. Additional guide bar members 126 and 128 align beneath the lower surface of the planar top member 118 to offer additional support for the planar top member 118 which extends along the length of the ram cylinder 76.

Figure 13:
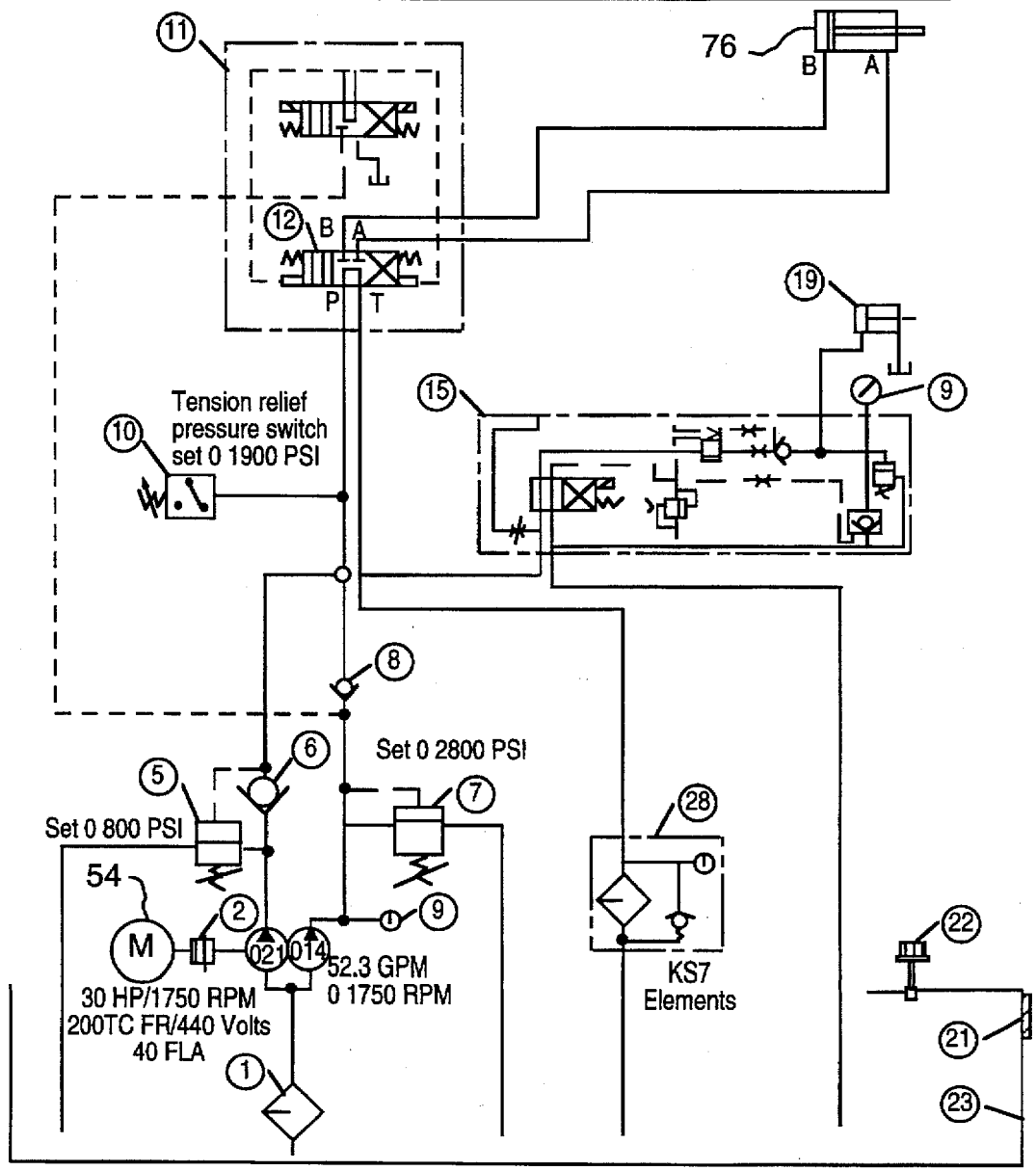
FIG. 13 illustrates a hydraulic schematic and reference chart for the hydraulic schematic.

FIG. 13 illustrates a hydraulic schematic and reference chart for the hydraulic circuit for the polystyrene densifier baler 10 for controlling hydraulic functions.

Figure 14:
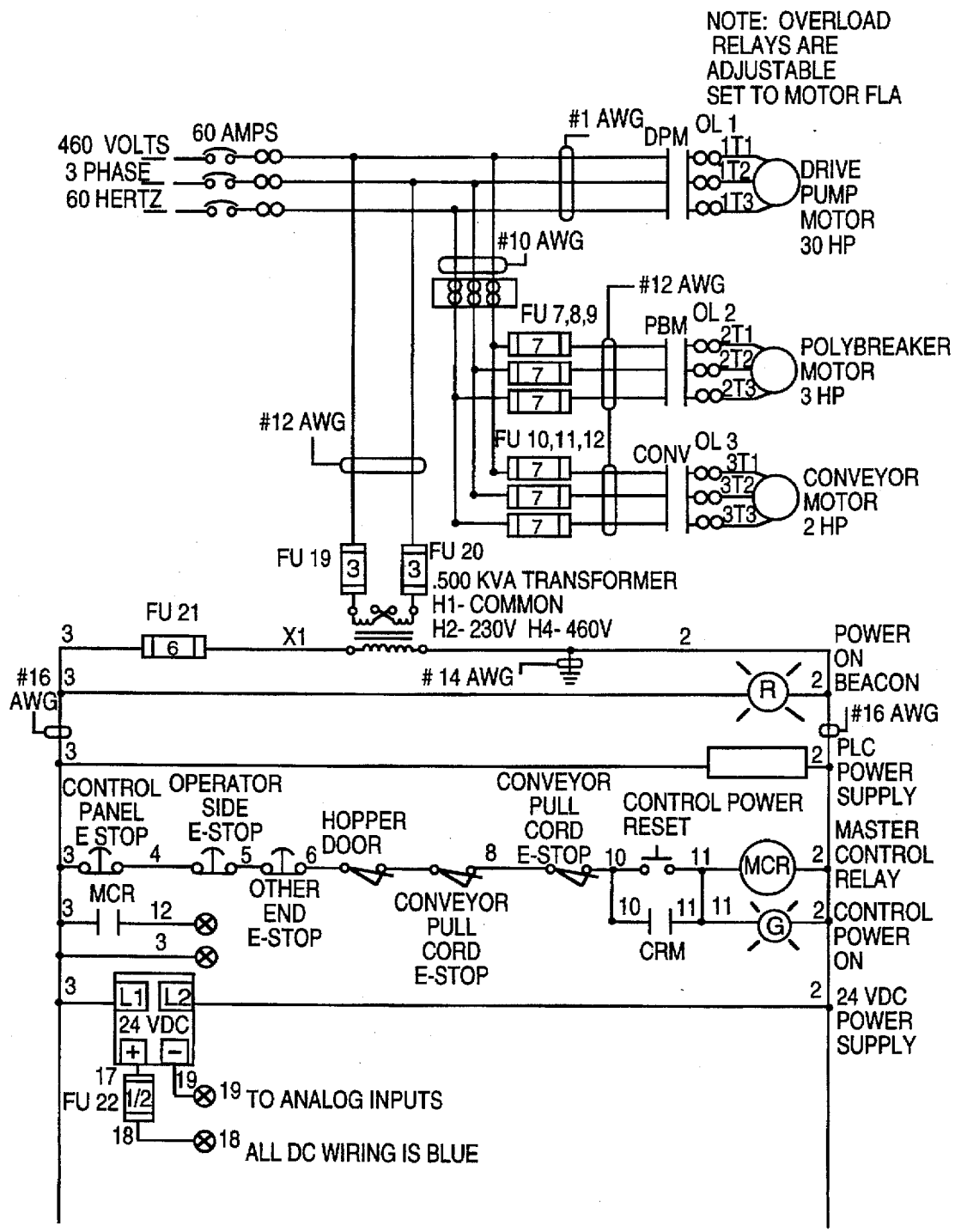
FIG. 14 illustrates an electrical schematic diagram for the polystyrene densifier baler.

FIG. 14 illustrates an electrical schematic diagram for control circuitry for the polystyrene densifier baler 10.

Figure 15:
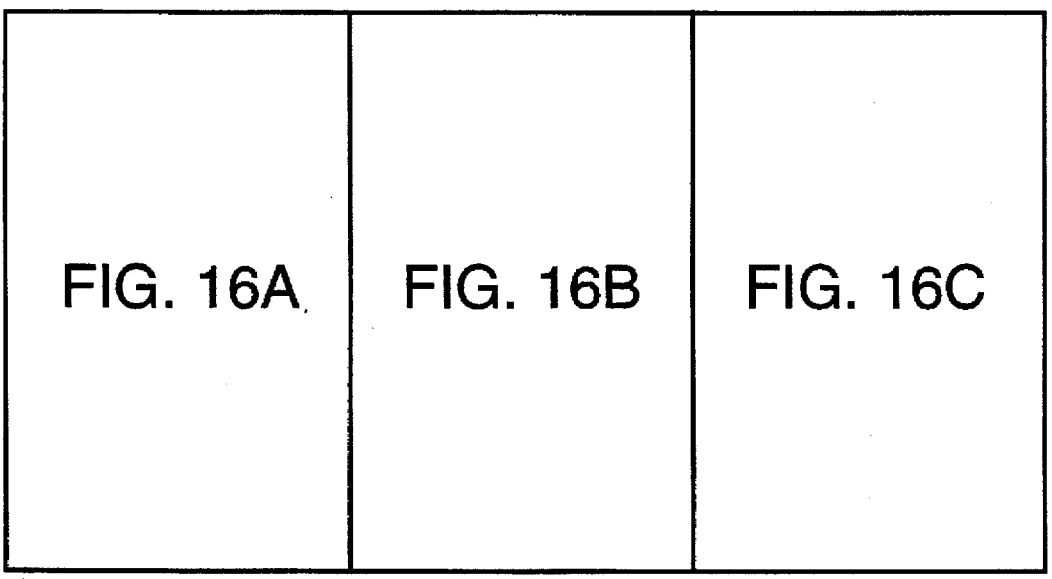
FIG. 15 illustrates the alignment of FIGS. 16A, 16B and 16C.
Figure 16A:
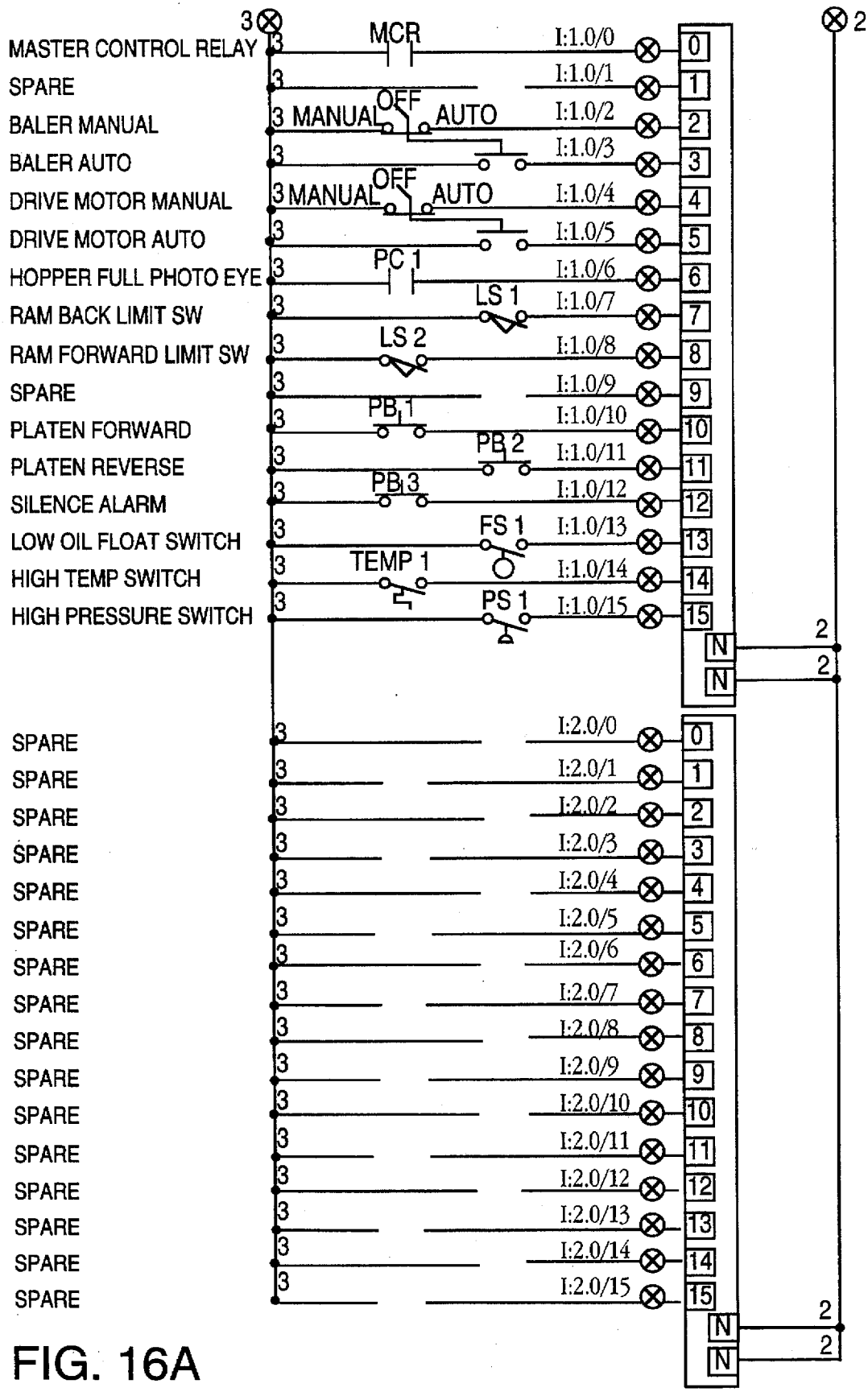
FIGS. 16A, 16B and 16C illustrate control circuitry for the polystyrene densifier baler.
Figure 16B:
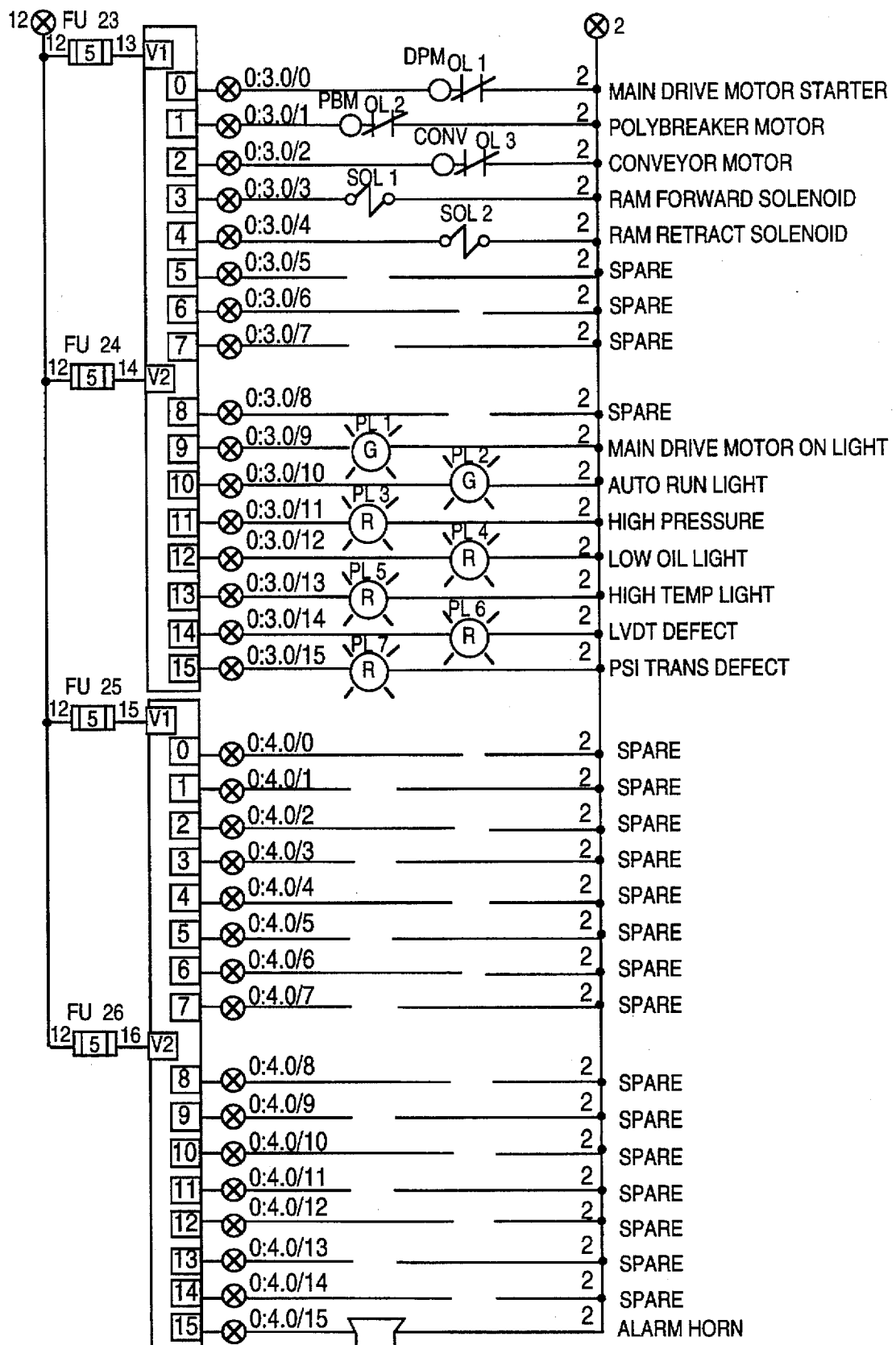
Figure 16C:
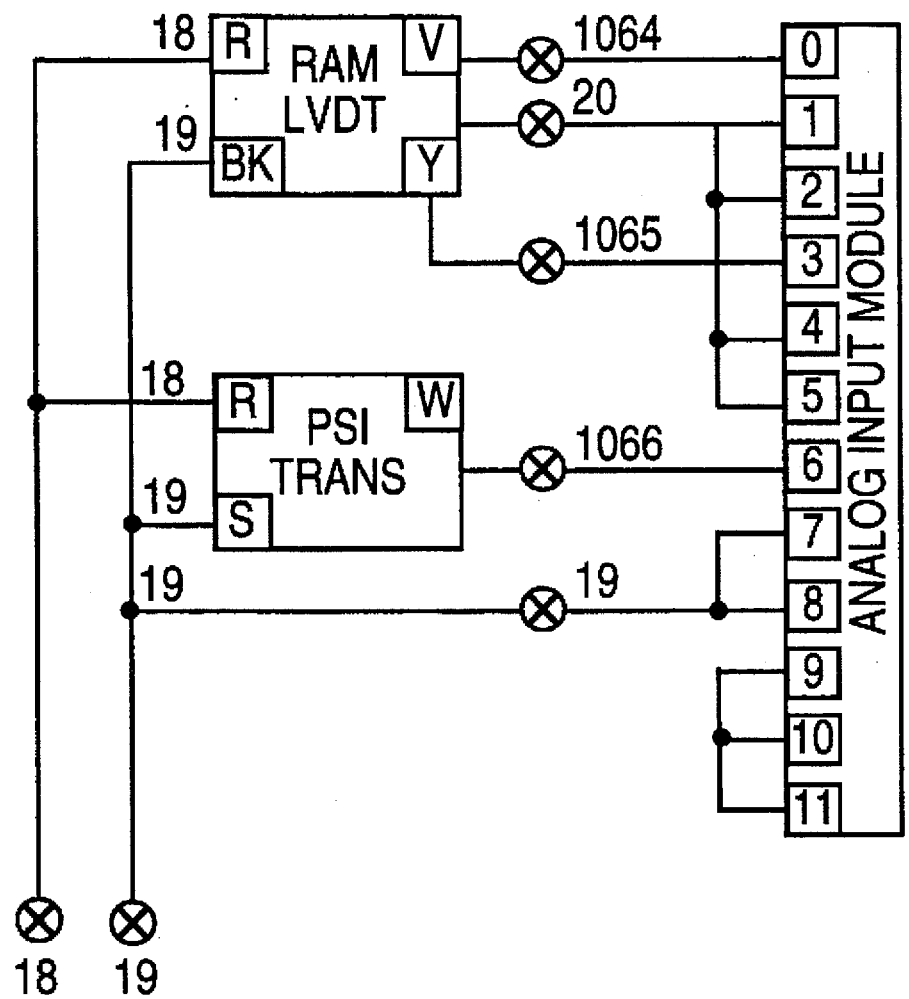

FIG. 15 illustrates the alignment of FIGS. 16A, 16B and 16C.

FIGS. 16A, 16B, and 16C illustrate an electrical schematic diagram for control circuitry for the polystyrene densifier baler 10.

Figure 17A:
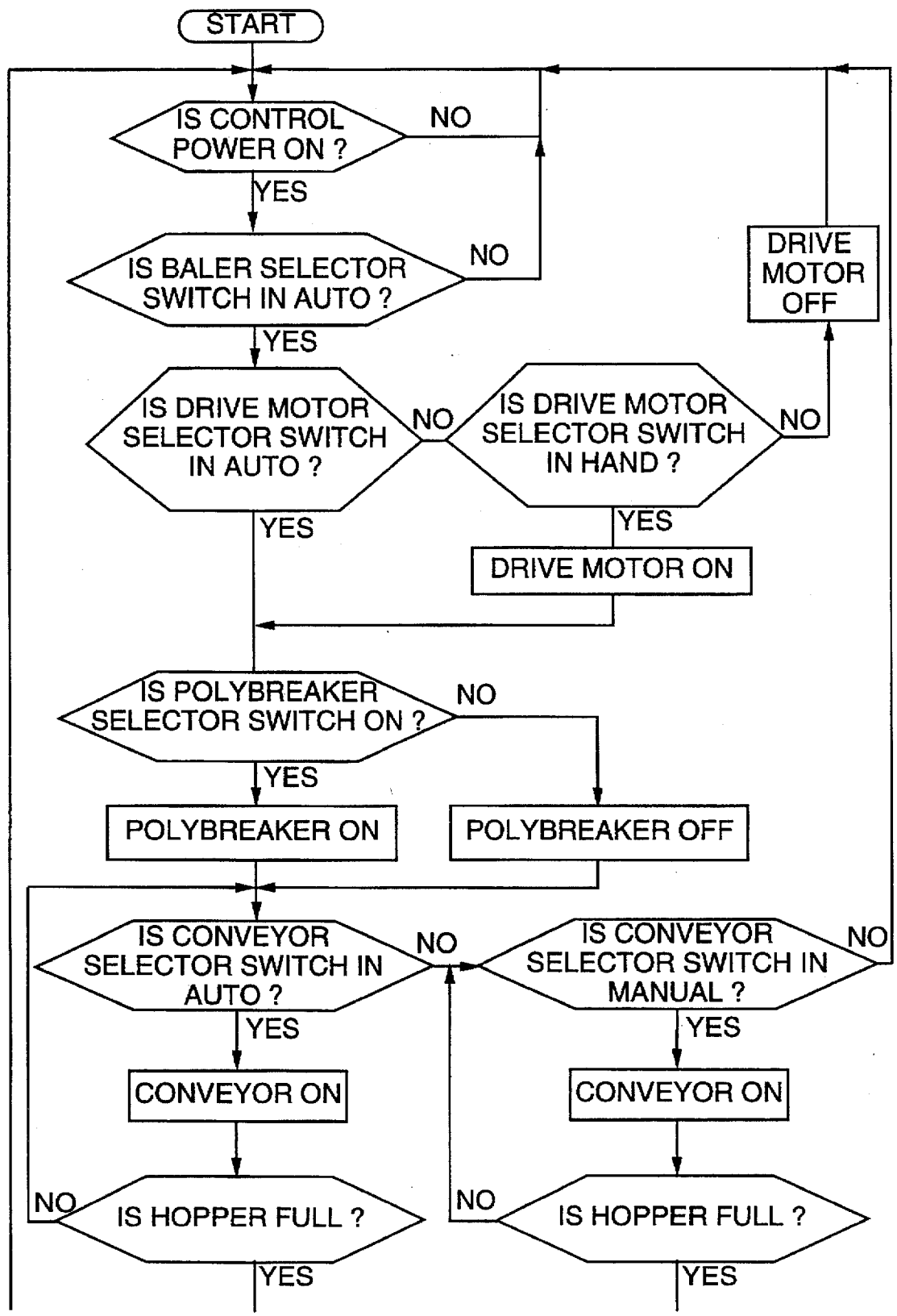
FIGS. 17A and 17B illustrate a flow chart for the operation of the polystyrene baler; and, FIG. 18, a first alternative embodiment, illustrates a front view of a bale chamber.
Figure 17B:
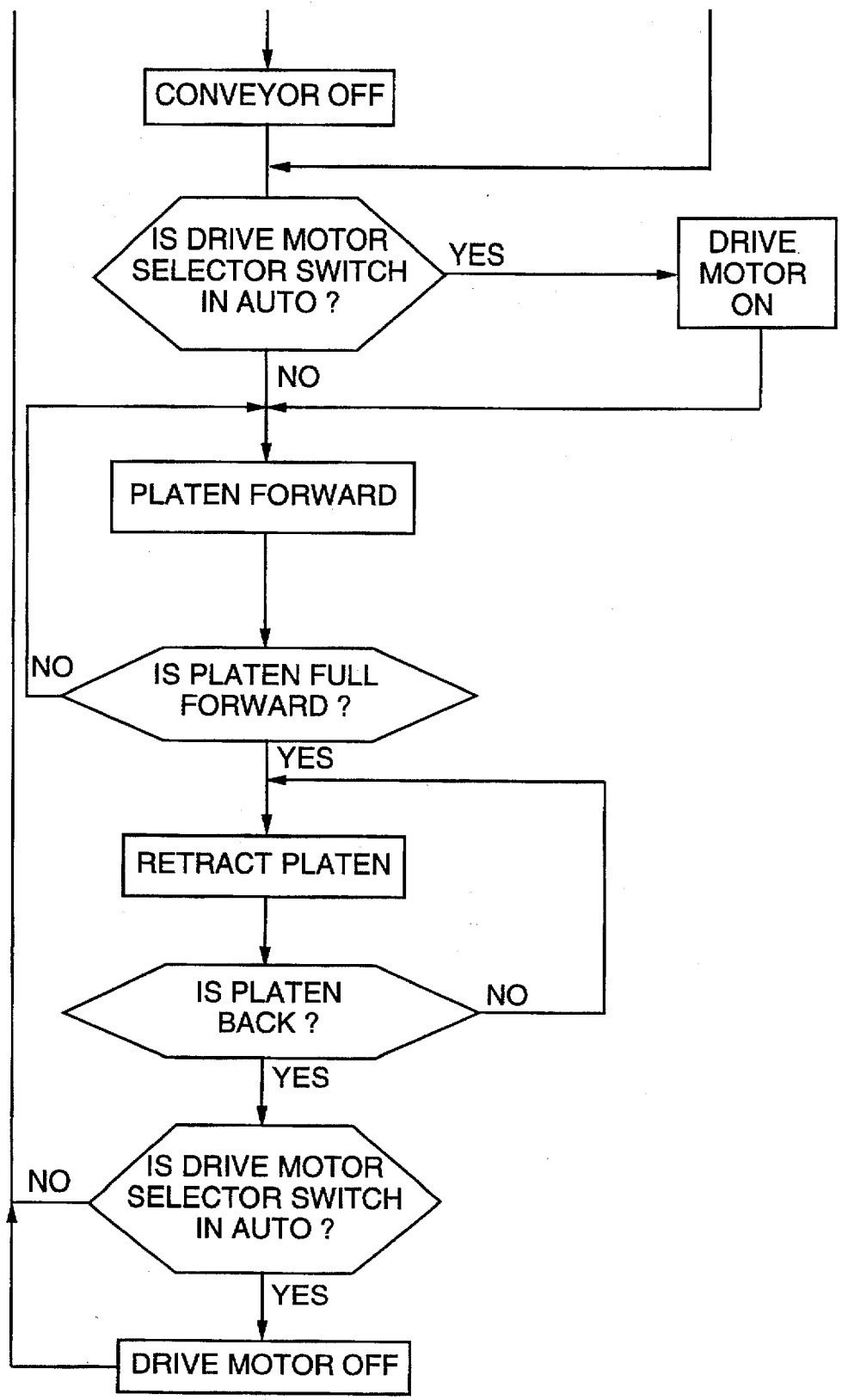

FIGS. 17A and 17B illustrate a flow chart for the operation of the polystyrene densifier baler.

MODE OF OPERATION

FIGS. 2 and 6 illustrate one mode of operation of the expanded polystyrene degasification and densification baler 10. Expanded polystyrene material is fed into the tapered hopper 20 where powerful internal chopping fingers break up and down size larger material into smaller more manageable sized pieces. The conveyor 18 carries the down sized material to the hopper 21 where the material is loaded into the charge chamber 12 for subsequent compaction to force the air or gas content from the particles of the chopped polystyrene material and breakdown the memory of the expanded polystyrene material by reducing the size through compression.

Initial charging of the chamber 15 may require that cardboard or like material of the appropriate compression quality be compressed first to form a plug in the chamber 15 so that initial compaction of polystyrene material can commence. Material is loaded into the charge chamber 12 and compressed by movement of the ram face plate 78 by the ram cylinder 76 into the charge chamber 12, as shown in dotted lines in FIG. 6. Material is advanced along the interior of the chamber 15 by action of the ram face plate 78.

Compaction takes place firstly by action of the ram head 78 along the length of the chambers. Secondly, compaction occurs across the chamber 15 as the walls 28 and 30 continually taper to a lesser dimension along the length of the bale chamber 12. Air and gases which are forced from the polystyrene material exit from the air gaps of the junction of the corners formed by the top and bottom with the sides. Continuous compacted polystyrene material exits the chamber 15 at the yoke assembly 38 where the material can be broken or cut into desired length bales or desired weight bales.

DESCRIPTION OF A FIRST ALTERNATIVE EMBODIMENT

FIG. 18, a first alternative embodiment, illustrates a front view of a polystyrene baler 200 similar to that of the polystyrene baler 10 with the addition of hydraulic tension cylinders which are incorporated to adjust the side members of the bale chamber inwardly and outwardly as later described in detail. The baler 200 includes a charge chamber 201, a hydraulic power unit 203, a ram enclosure 205, a conveyor 207, a hopper 209, having internal chopper teeth fingers, and a hopper 213 mounted over the ram enclosure 205. The charge chamber 201 includes a top 202, a bottom 204, sides 206 and 208, a ram face plate 211, upper and lower parallel support struts $210a$–$210e$, and $212a$–$212e$ and other struts over, about and along the sides and bottom, which are similar to those described for the baler of the previous FIGS. 1–17. A yoke assembly 214, including an optional side adjuster assembly 216, encompasses the output end of the polystyrene baler 200. Yoke assemblies 218 and 220, having hydraulic cylinders 222, 224, 226 and 228, surround and are spaced about the baler 200. A yoke assembly 230 is located inboard of the yoke assembly 220 as illustrated. The hydraulic tensioning cylinders 222 and 226 act to move the side 206 inwardly as illustrated by inwardly depressed side section $206a$ in dashed lines of FIG. 19. Similarly side 208 is hydraulically actuated inwardly by hydraulic actuator sets 224 and 228 to depress the side 208 inwardly such as shown by position $208a$ shown in dashed lines. The hydraulic cylinders 222–228 are actuated to apply sideways pressure upon the polystyrene in the charge chamber 201 of the polystyrene baler 200 to offer additional aid in destroying the memory of the polystyrene and to assist in forcing the gaseous material from the bale. The hydraulic actuators 222–228 can also hold the bale material in place in the polystyrene baler 200 when the ram face plate 211 is retracted so that more polystyrene material can be added for chamber compression. This maneuver maintains bale compression forces so that ground is not lost during material addition. When polystyrene is again compressed in the polystyrene baler 200 by the ram, the hydraulic tension cylinders are then relaxed slightly to allow for forward movement of the compressed polystyrene within the chamber as previously described.

Figure 19:
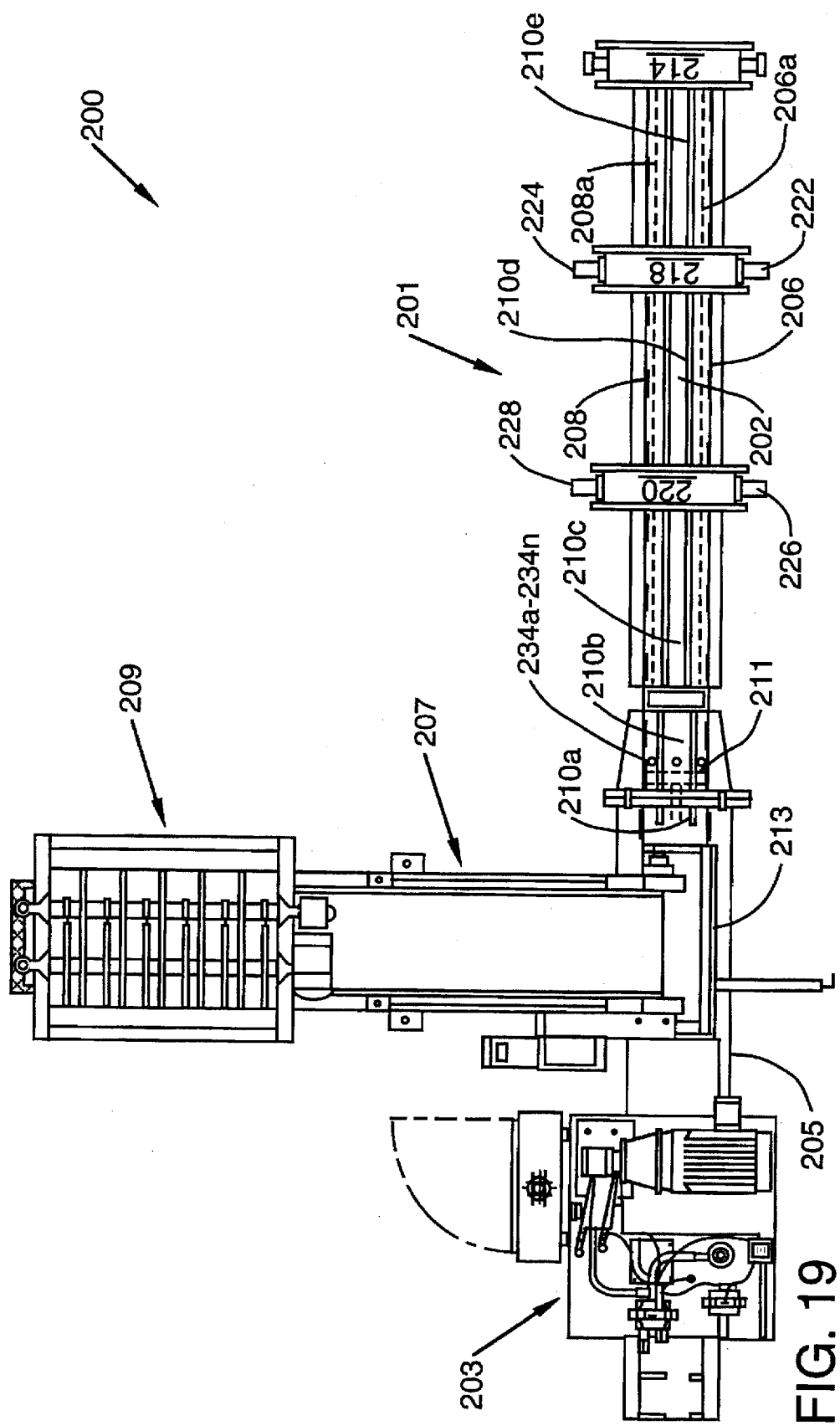
FIG. 19 illustrates a top view of FIG. 18.

FIG. 19 illustrates a top view of the baler 200 where all numerals correspond to those elements previously described. Specifically, the hydraulic tension cylinders 222–228 are illustrated in an engaged position.

Figure 20:
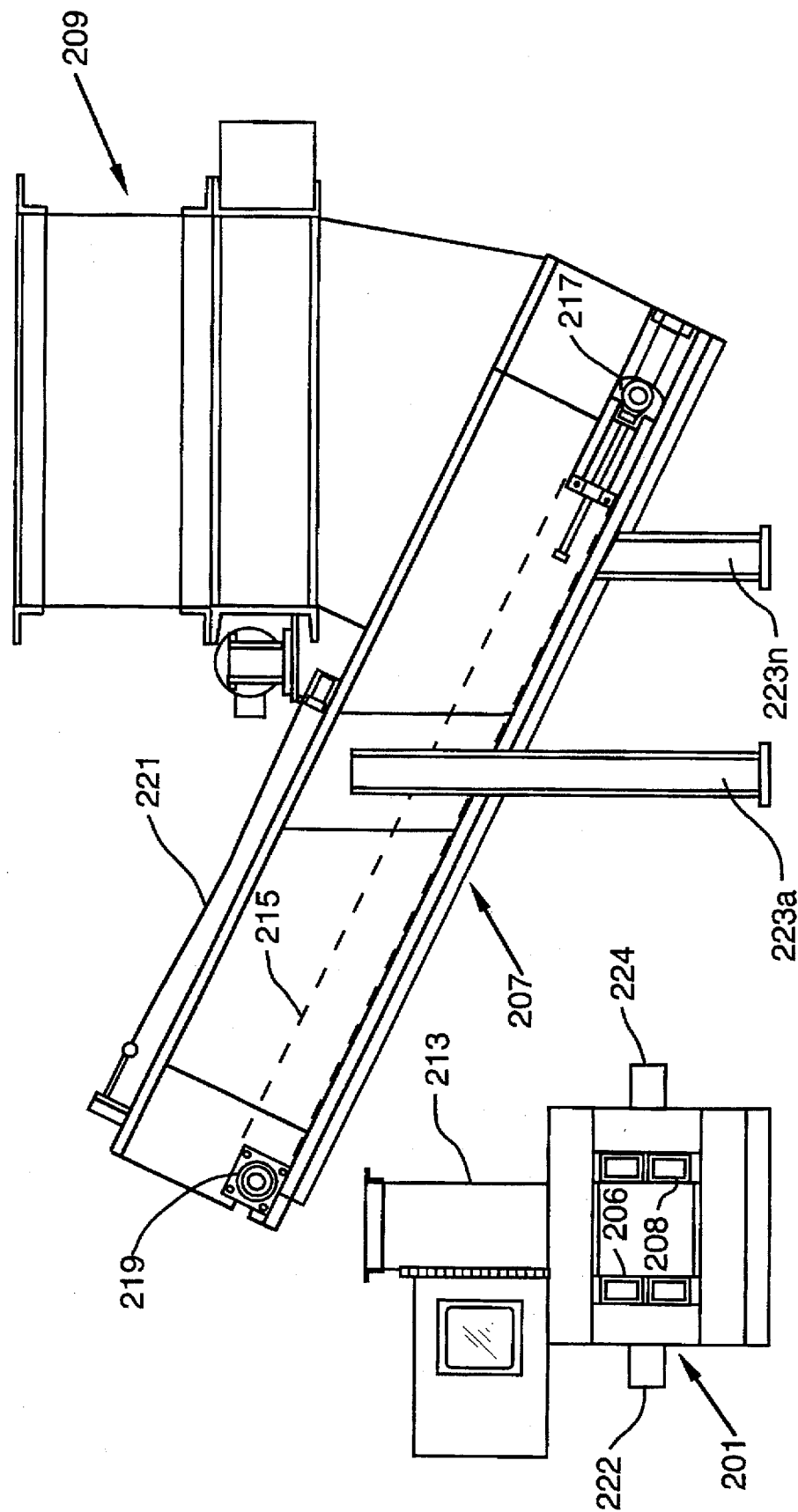
FIG. 20 illustrates an end view of FIG. 18.

FIG. 20 illustrates an end view of the baler 200 where all numerals correspond to those elements previously described. The conveyor 207 includes a conveyor belt 215 aligned between a powered adjustable drive roller assembly 217 and a tail roller assembly 219. One or more optional safety stop lines 221 align along the upper region of the conveyor 207. A plurality of legs $223a$–$223n$ provide support for the conveyor 207.

Figure 21:
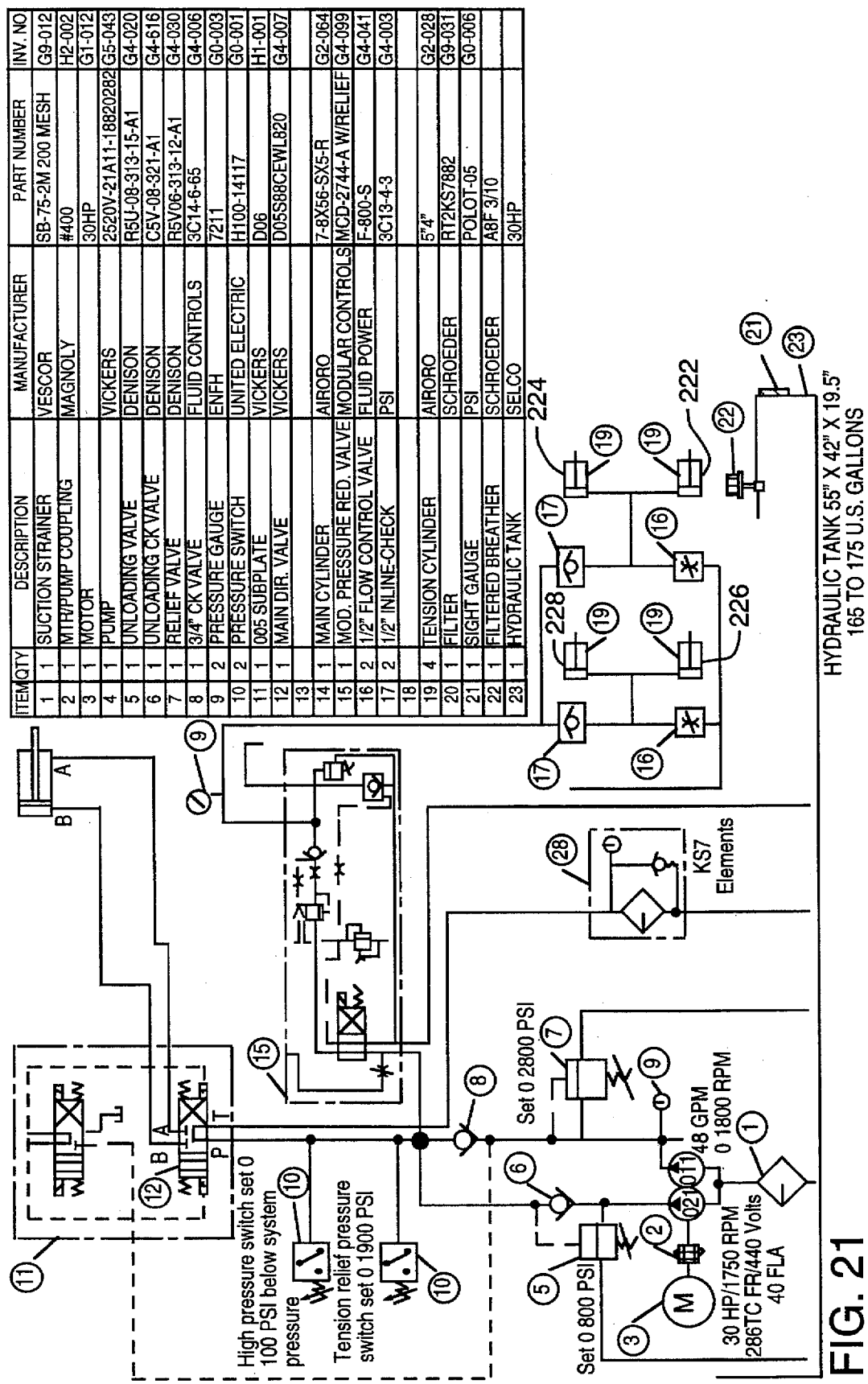
FIG. 21 illustrates a hydraulic schematic and reference chart for the hydraulic schematic.

FIG. 21 illustrates the hydraulic schematic and the reference chart for the hydraulic circuit for the polystyrene baler 200 for controlling hydraulic functions. The hydraulic tension cylinders 222–228 are illustrated.

Figure 22:
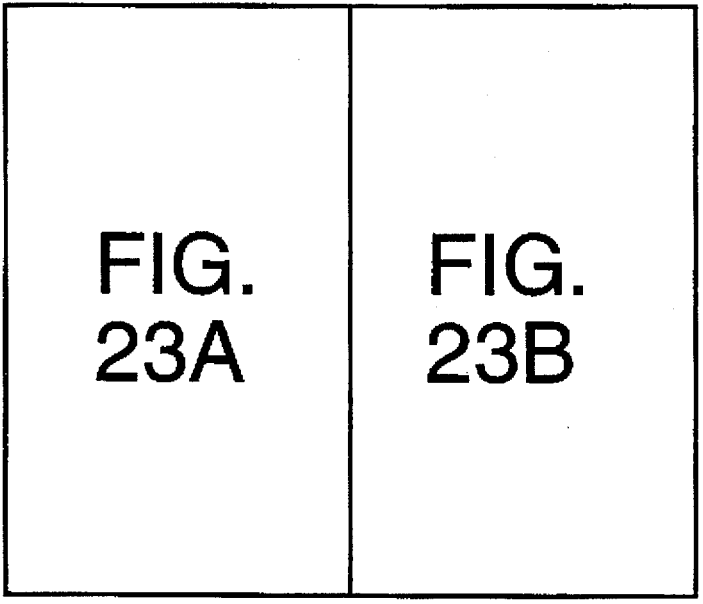
FIG. 22 illustrates the alignment of FIGS. 23A–23B.
Figure 23A:
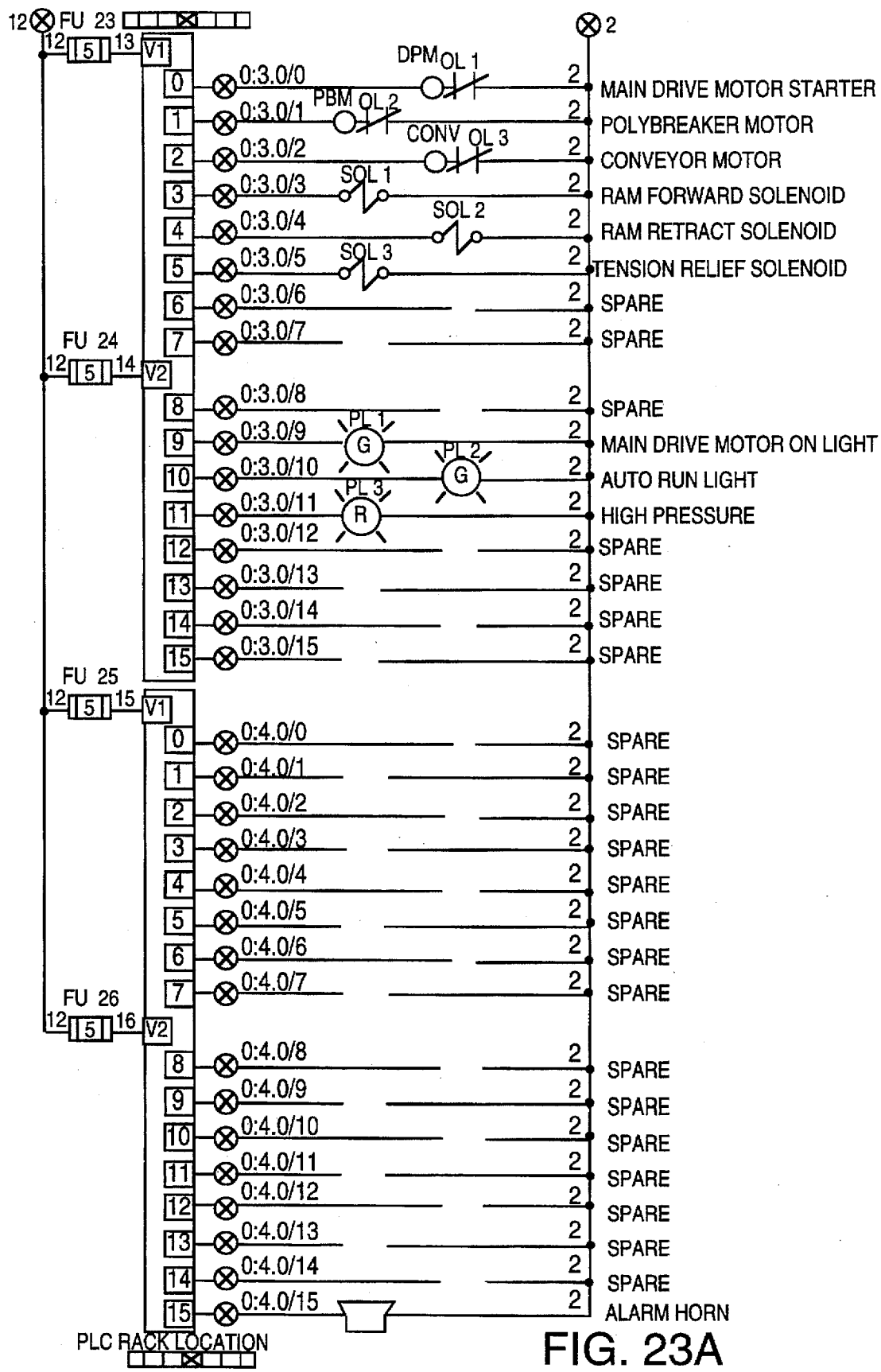
Figure 23B:
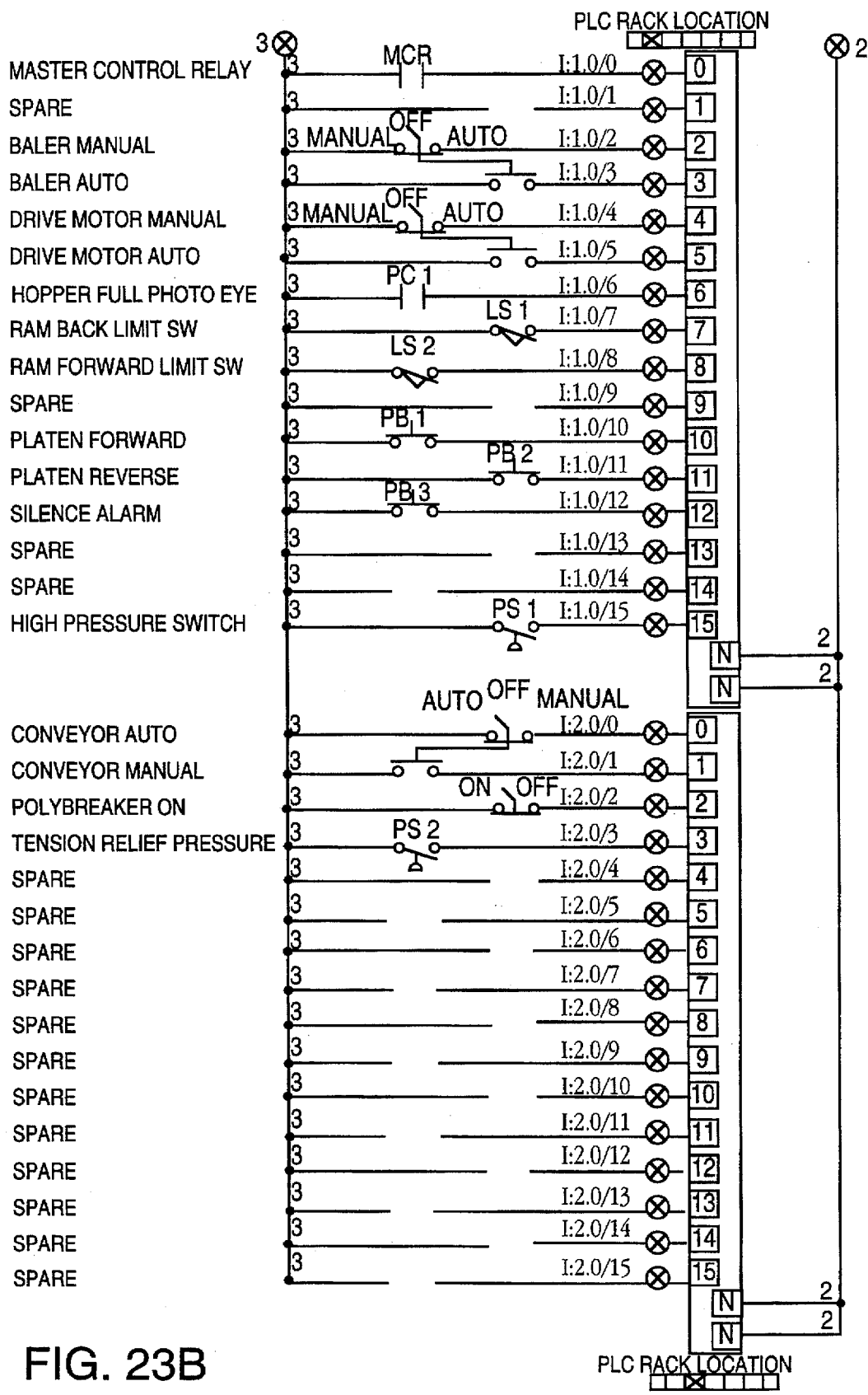

FIG. 22 illustrates the figure alignment of FIGS. 23A–23B.

FIGS. 23A–23B illustrate the electrical schematic diagrams for controlling the electric, electromechanical and hydraulic operations by a logic controller, such as an Allen Bradley small logic controller or programmable logic controller. In the alternative, a relay switching or microprocessor controller could also be used in lieu of a logic controller. The specific logic controller for this example and not to be construed as limiting is an Allen Bradley SLC500.

FIG. 24 illustrates an electrical schematic diagram for the control circuitry for the polystyrene baler 200.

FIGS. 25A and 25B illustrate the flow chart for the operation of the polystyrene baler.

MODE OF OPERATION

The dimension of the cube would be sized for ram face cross section, and the suggested size is by way of example and for purposes of illustration only and not to be construed as limiting of the present invention.

The operation of the expanded polystyrene baler 200 is similar to that of FIGS. 1–17 with the exception of the optional side tensioning cylinders as later described in detail.

One desired cross-sectional size of the expanded polystyrene blocks is 14" wide by 13" high for convenience of palleting the blocks. The cross-sectional size can range from 4" wide by 4" high to 24" wide by 24" high. The desired density ranges from 8–40 pounds per cubic foot. One desired weight is 18 pounds per cubic foot for filling a truck trailer while expanded polystyrene recyclers prefer a density of 28–30 pounds per cubic foot. The length of the densification chamber can be in a range of 5–25 feet. The ram face pressure can be in a range of 150–800 psi, and one operational pressure is 500 psi. A face of the ram which is 14"×13" can also include an approximately centered block of material 232, such as steel, on the ram face plate which is 4"h×4"w× 2"d, as illustrated in FIG. 18. Any other suitable geometrical configuration can be utilized to initiate compression of the material, and also causing the gases to travel from the center of the material being compressed outwardly towards the edges. A plurality of holes $234a$–$234n$ are located in the structure of the charge chamber 201 for release of gases from the compressed material. This block provides for breaking and compressing of the expanded polystyrene material from the center of the cube outwardly. This action is thermodynamic in nature causing the material to reduce in size while still maintaining substantially the same mass.

The side tensioning cylinders can move in a range of 1/16" to 1", preferably about 1/8", and maintain side tension on the cube or log of compressed expanded polystyrene until a predetermined preset hydraulic system pressure is reached, at which time the tension is released for 1/2–10 seconds, preferably for 1–2 seconds. The tension cylinders are again actuated on rearward movement of the ram. The side tension cylinders provide for maintaining the dimensions of the cube, as well as providing for further compression for degasification and densification. While two pairs of tensioning cylinders are illustrated, one pair of tensioning cylinders is also within the teaching of the present invention, or also especially if the length of the degasification and densification chamber is shorter length. The air gap between the sides and the upper and lower plates provide for release of any gases during compression and along the length of travel in the chamber, gas escape holes can also be provided at point on each side plate to provide for escaping gases. It is noted that at about the end of travel of the ram face plate, considerable heat is generated through thermodynamic action, further adding to the actions of the compression of the expanded polystyrene into a cube, which can also be referred to as a log.

The bales can be easily formed by breaking the bales off at the end of the chamber. In the event that the bales will not easily break, the bales can be broken with a simple wedge, such as that used to split logs. As illustrated in FIG. 18, the bales 310 can exit the chamber on a pallet 312 covered with cardboard, a table or a roller table. The bales can be sized to engage a 42" or 48" pallet and stack as high as desired, such as four or five bales high.

The polybreaker can break the pieces of the expanded polystyrene into suitable sizes, such as 6" or less pieces. One preferred size is 3". A size for system air transport to the charging chamber of the polystyrene baler can be a golf ball to a tennis ball size. The teeth and blades of the polybreaker can be preferably 1½" to 3" apart so long as the pieces are broken into an appropriate size.

The structure of FIGS. 18–24 can be modified within the scope of the teachings of this invention. For example, rather than two pairs of tension cylinders, a shorter degasification and densification chamber may be provided with only one tension cylinder. The particular sizing and placement of the yokes, such as the yoke near the flange and the yoke near the exit, can either be down sized, or in the alternative, eliminated, depending upon the length of the degasification and densification chamber, the cross section of the chamber, the tapering of the chamber, the number of tension cylinders and the pressure settings for the tension cylinders. Teachings of the present invention an extend from a charged chamber, a compression chamber, which is part of the degasification and densification chamber, and a length of cross section of the chamber with no tapering to the more sophisticated embodiment of that illustrated in FIGS. 18–24.

The baler can also bale other materials, such as polymers (plastic), aluminum cans, aluminum shavings, copper wire, or cardboard boxes. The bales could also be extruded as square logs. Through put of material is based on bale density. It is desirable to degas and densify the bale for approximately one hour of material travel. The bore can be in a range of 4–8".

System pressure is in a range of 500–3000 psi with platen face pressure of 100–1000. The polybreaker desirably would break material in approximately a cube of 1–5", more so closer to 3 inches. Finally, the sides could be provided for oscillating at a desired frequency or more frequently than on every forward ram actuation.

DESCRIPTION OF A SECOND ALTERNATIVE EMBODIMENT

FIG. 26 illustrates a cross-sectional view of the degasification and densification chamber 300 with grooves 302 and 304 and ridges 306 and 308 in the top and bottom members for forming geometrical indentations and projections into the material for purposes of stacking, such as stacking on a pallet.

Various modifications can be made to the present invention without departing from the apparent scope hereof.

We claim:

1. A method of baling low density material having a form memory, comprising:

feeding the material into a degasification and densification chamber having sides, an inlet and an outlet;

compressing the material to form a bale of compressed material; and maintaining the material in a compressed state for a sufficient time to enable the form memory of the material to be broken and to allow the material to be degassed, wherein the material is polystyrene, and is compressed to a density in a range of 8 to 30 pounds per cubic foot.

2. A method as claimed in claim 1, wherein the density of the compressed polystyrene is about 25 pounds per cubic foot.

3. A method as claimed in 1 wherein the density of the compressed polystyrene is 28–30 pounds per cubic foot.

4. A method of baling low density material having a form memory, comprising:

feeding the material into a degasification and densification chamber having sides, an inlet and an outlet;

compressing the material to form a bale of compressed material, wherein said step of compressing the material comprises the step of applying a force from said inlet toward said outlet of said degasification and densification chamber, and said sides of said degasification and densification chamber being inwardly adjusted to provide a decreasing cross section from said inlet to said outlet of said degasification and densification chamber; and, maintaining the material in a compressed state for a sufficient time to enable the form memory of the material to be broken and to allow the material to be degassed.

5. The method of claim 4 wherein said force is additionally applied to said sides of said degasification and densification chamber.

* * * * *